(12) United States Patent
Hasegawa et al.

(10) Patent No.: US 8,765,839 B2
(45) Date of Patent: Jul. 1, 2014

(54) INKJET INK SET, INKJET RECORDING DEVICE, AND INKJET RECORDING METHOD

(71) Applicants: Shin Hasegawa, Shizuoka (JP); Hiroyuki Fushimi, Shizuoka (JP)

(72) Inventors: Shin Hasegawa, Shizuoka (JP); Hiroyuki Fushimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/760,374

(22) Filed: Feb. 6, 2013

(65) Prior Publication Data

US 2013/0202862 A1 Aug. 8, 2013

(30) Foreign Application Priority Data

Feb. 6, 2012 (JP) .................................. 2012-023056

(51) Int. Cl.
*C09D 11/30* (2014.01)

(52) U.S. Cl.
USPC ..... 523/160; 523/161; 428/211.1; 428/195.1; 347/100; 347/86; 347/40; 524/507; 524/160; 524/367

(58) Field of Classification Search
USPC ........................................................ 523/160
See application file for complete search history.

(56) References Cited

U.S. PATENT DOCUMENTS

| | | | |
|---|---|---|---|
| 5,085,698 A | 2/1992 | Ma et al. | |
| 5,172,133 A | 12/1992 | Suga et al. | |
| 5,221,334 A | 6/1993 | Ma et al. | |
| 5,571,311 A | 11/1996 | Belmont et al. | |
| 7,101,919 B2 | 9/2006 | Hasegawa et al. | |
| 7,798,629 B2 | 9/2010 | Hakiri et al. | |
| 8,197,049 B2 | 6/2012 | Hakiri et al. | |
| 8,247,473 B2 | 8/2012 | Naruse et al. | |
| 2003/0008938 A1* | 1/2003 | Sano et al. ..................... | 523/160 |
| 2003/0196571 A1 | 10/2003 | Hakiri et al. | |
| 2006/0209149 A1 | 9/2006 | Hasegawa et al. | |
| 2006/0272543 A1 | 12/2006 | Hakiri et al. | |
| 2008/0036830 A1 | 2/2008 | Natori et al. | |
| 2008/0036840 A1* | 2/2008 | Hakiri et al. .................. | 347/100 |
| 2008/0051472 A1 | 2/2008 | Kwetkat et al. | |
| 2008/0207805 A1 | 8/2008 | Blease et al. | |
| 2010/0302306 A1 | 12/2010 | Hasegawa et al. | |
| 2010/0309260 A1 | 12/2010 | Hakiri et al. | |
| 2011/0074865 A1 | 3/2011 | Hasegawa et al. | |
| 2011/0267398 A1 | 11/2011 | Hakiri et al. | |
| 2012/0026237 A1 | 2/2012 | Hakiri et al. | |
| 2012/0062646 A1 | 3/2012 | Hasegawa et al. | |
| 2012/0154492 A1 | 6/2012 | Hakiri et al. | |
| 2012/0207984 A1 | 8/2012 | Hasegawa et al. | |
| 2012/0242741 A1 | 9/2012 | Hasegawa et al. | |

FOREIGN PATENT DOCUMENTS

| | | |
|---|---|---|
| JP | 56-147871 | 11/1981 |
| JP | 05-239392 | 9/1993 |
| JP | 8-3498 | 1/1996 |
| JP | 8-81646 | 3/1996 |
| JP | 08-283633 | 10/1996 |
| JP | 8-333531 | 12/1996 |
| JP | 9-194775 | 7/1997 |
| JP | 2000-63727 | 2/2000 |
| JP | 2000-144028 | 5/2000 |
| JP | 2001-81366 | 3/2001 |
| JP | 2001-146564 | 5/2001 |
| JP | 2001-294788 | 10/2001 |
| JP | 2002-003767 | 1/2002 |
| JP | 2003-509571 | 3/2003 |
| JP | 2004-123904 | 4/2004 |
| JP | 3625595 | 3/2005 |
| JP | 2005-105227 | 4/2005 |
| JP | 2005-281691 | 10/2005 |
| JP | 2005-314528 | 11/2005 |
| JP | 2006-008858 | 1/2006 |
| JP | 2006-45436 | 2/2006 |
| JP | 2006-188626 | 7/2006 |
| JP | 2006-219584 | 8/2006 |
| JP | 2006-282781 | 10/2006 |
| JP | 2007-119551 | 5/2007 |
| JP | 2007-186642 | 7/2007 |
| JP | 2010-520324 | 6/2010 |
| JP | 2011-6672 | 1/2011 |
| JP | 2011-116857 | 6/2011 |
| WO | WO 2010/137745 | * 12/2010 |

* cited by examiner

*Primary Examiner* — Doris Lee

(74) *Attorney, Agent, or Firm* — Oblon, Spivak, McClelland, Maier & Neustadt, L.L.P.

(57) ABSTRACT

An inkjet ink set containing a first pigment ink and a second pigment ink. The first pigment ink includes an anionic self-emulsification ether polyurethane, and the second pigment ink includes a styrene acrylic resin emulsion.

10 Claims, 4 Drawing Sheets

INKJET INK SET, INKJET RECORDING DEVICE, AND INKJET RECORDING METHOD

CROSS-REFERENCE TO RELATED APPLICATIONS

This patent application claims priority pursuant to 35 U.S.C. §119 to Japanese Patent Application No. 2012-023056, filed on Feb. 6, 2012, the entire disclosure of which is hereby incorporated by reference herein.

FIELD OF THE INVENTION

An object of the invention pertains to an inkjet ink set, an ink cartridge, an inkjet recording device, an inkjet recording method, and a printed substrate.

BACKGROUND OF THE INVENTION

Compared to other printing methods, an inkjet recording method offers ease of full-color printing since it involves a simpler process. The inkjet recording method provides high-resolution images in spite of being simplier.

As inkjet recording inks, dye-based inks are used in which various types of water-soluble dyes are dissolved in water or a mixture of water and an organic solvent. Such dye-based inks have poor light resistance, though they are excellent in color tone sharpness.

Pigment-based inks in which carbon black and various types of organic pigments are dispersed are superior in light resistance compared to that of dye-based inks, and thus studies on pigment-based inks are being intensively conducted.

However, pigment-based inks are more likely to cause nozzle clogging compared to dye-based inks.

Pigment inks are generally prepared as follows. A coloring material and a dispersant are preliminarily dispersed in an aqueous solvent to prepare a dispersion product. The dispersion product is then dispersed to a predetermined degree in a media-type disperser, followed by diluting to a predetermined concentration.

Water-based pigment inks usually contain a surfactant and a water-soluble resin to disperse a hydrophobic pigment therein. However, the majotiry of the pigment does not penetrate into an ink absorbing layer of the inkjet recording sheet and stays on the sheet to form a coating film. Therefore, when a water-based pigment ink is used for the inkjet recording sheet, a printed image may have lesser gloss or lesser abrasion-resistance than that of the aqueous pigment ink when used for plain paper or dye ink which penetrates into the ink absorbing layer easily. In this case, the printed image may have poor quality due to peeling of the coating film which causes ambient defacement, when the printed image is scratched.

Thus, according to some known techniques, film-formable resin fine particles are added into inks to improve quality of images. However, it is difficult to keep a plurality of components finely and stably dispersed throughout the ink for a long period of time. Thus, when a dispersant such as a surfactant is used in a large amount in order to stably disperse such fine particles, air bubbles may be generated inside the ink tank and/or inkjet head, which could cause degradation of the image quality.

Likewise, to improve dispersibility, the effectiveness of methods that change the surface of a pigment to a hydrophilic group, or, the effectiveness of using a resin containing a hydrophilic group has been studied. However, while a given component may be stable when used alone, the combined use of several different components may cause degradation of dispersion stability and storage stability.

Patent Literature (PTL) 1 to 3, Japanese Patent Application Laid-Open (JP-A) No. 2007-186642, JP-A No. 2006-282781, and JP-A No. 2005-105227, proposed a surface-treated pigment ink, which gives excellent printing quality, and has excellent jetting stability and storage stability, or has only excellent jetting stability. PTL 4, JP-A No. 2007-119551, proposed an ink set, which can maintain stable jetting performance of inks.

To obtain a high image density of a printed image, PTL 5, JP-A No. 2006-8858, discloses a method in which ink containing a water-insoluble coloring agent and charged resin quasi-particles which are smaller than particles of the coloring agent, is used. PTL 6, JP-A No. 2002-3767, discloses a method in which ink containing a self-dispersible pigment having an optimized DBP oil absorption is used; and PTL 7, JP-A No. 2006-219584, discloses a method in which an aqueous dispersion liquid of carbon black containing carbon black which has been surface-modified to have the HLB value of 7 to 18, and a nonionic surfactant having an acetylene skeleton in the molecular structure thereof, is used.

PTL 8 JP-A No. 2004-123904, discloses aqueous ink containing an acetylene glycol-based surfactant.

To stabilize a dispersion state of an ink, PTL 9, JP-A No. 05-239392, discloses a method of dispersing a water-dispersible resin having a carboxyl group and a nonionic hydrophilic group in the molecule thereof in water; PTL 10, JP-A No. 08-283633 discloses a method in which polarities of a water-soluble polymer and a surfactant are made the same, or nonions are added thereto; PTL 11, JP-A No. 2000-63727, discloses a method in which an aqueous recording liquid is controlled so that an ionic coloring agent-containing a polyester resin and hydrophilic groups of the coloring agent have the same polarity; and PTL 12, JP-A No. 2001-81366, discloses a method in which a dispersed pigment and dispersed resin particles are controlled to have the same polarity.

PTL 13, JP-A No. 2003-509571, discloses a printing ink using a gemini surfactant as a dispersing agent.

PTL 14, JP-A No. 08-333531, describes an aqueous inkjet ink composition containing a pigment dispersion liquid, an aldehyde naphthalene sulfonate dispersing agent, and/or at least one sulfone solvent, wherein the pigment particle dispersion liquid contains pigment particles having the particle size distribution so that at least 70% of the particles in the dispersion liquid have a diameter of less than 0.1 µm, and the other particles have a diameter equal to or more than 0.1 µm. PTL 15, JP-A No. 56-147871, describes a recording liquid formed of an aqueous medium containing a pigment, a polymeric dispersing agent and a nonionic surfactant.

PTLs 16 and 17, U.S. Pat. No. 5,085,698 and U.S. Pat. No. 5,221,334, describe the use of an AB or BAB block-copolymer as a dispersing agent of a pigment. PTL 18, U.S. Pat. No. 5,172,133, describes that a specific pigment, water-soluble resin and solvent are used.

As a method for dispersing a pigment without using a dispersing agent, PTL 19, U.S. Pat. No. 5,571,311, discloses a method in which a substituent including a water-soluble group is introduced into carbon black; PTL 20, JP-A No. 08-81646, discloses a method in which a water-soluble monomer is polymerized onto a surface of carbon black; and PTL 21, JP-A No. 08-3498, discloses a method for an acid-treated carbon black.

PTL 22, JP-A No. 09-194775, describes a method in which water-resistance and jetting stability are attained by using an ink containing an acid-treated carbon black, and a terpolymer formed of acrylic acid, styrene, and α-methyl styrene.

PTL 23, JP-A No. 2000-144028, describes an inkjet recording liquid containing dispersed particles having the average particle diameter of from 30 nm to 200 nm.

Although conventional ink liquids could provide a high image density with a color pigment ink, a black pigment ink does not provide a sufficient image density, and satisfactory black pigment inks have not yet been described.

PTL 24 to 26, JP-A No. 2005-281691, JP-A No. 2005-314528, and JP-A No. 2006-188626, describe examples in which beads having a diameter of approximately 0.05 mm to approximately 1.0 mm are used for the bead mill dispersion; however dispersion stability of the resultant dispersion is not sufficient.

PTL 27, Japanese patent (JP-B) No. 3625595, describes the use of an anionic surfactant as a dispersing agent, and that the molecular weight of a such surfactant is preferably in the range of $1,000 \leq m \leq 30,000$. However, the resultant ink liquid does not have sufficient dispersion stability, and also loses its dispersion stability when a pigment that is not resistant to the impact caused by dispersing is used, and, as a result, the ink liquid has poor jetting stability.

PTL 28, JP-A No. 2011-116857, discloses a method for improving jetting stability and preservation stability by mixing two different types of dispersion elements, including a surfactant and a capsule, wherein a particle diameter of the mixture of elements is adjusted properly. However, in this method the bleeding can not be prevented.

To prevent bleeding of pigment ink, PTL 29, JP-A No. 2001-294788, discloses a technology for prevention of the movement of carbon black as a pigment, by agglutinating an element of black ink using an agglomerating agent, wherein the agglomerating agent is included in color inks such as cyan ink, magenta ink, and yellow ink. When using this technology, it is estimated that the bleeding of black ink may be prevented to some degree. This technology assumes that paper is a recording medium; however, the bleeding may not be prevented when this method is used on cloth having large spans between fibers compare to paper. In addition, because it is possible to wash cloth, the image dencity may become lower when cloth is washed and then ink is removed.

To prevent bleeding, PTL 30, JP-A No. 2011-6672, discloses a mixture containing two anionic self-emulsification ether-based polyurethane resins having different acid values. However, the bleeding can not be prevented sufficiently by this method.

BRIEF SUMMARY OF THE INVENTION

As a result of the continuous effort, the present inventors have found that jetting stability and preservation stability of ink can be improved, and bleeding can be prevented, by using predetermined different types of resin emulsions in a first pigment ink and second pigment ink. Thus, the inventors complete an object of the invention.

According to an object of the invention, an inkjet ink set, which prevents bleeding between colors, having excellent jetting stability and excellent storage stability is provided.

In one embodiment, an inkjet ink set comprises a first pigment ink, and a second pigment ink, wherein the first pigment ink includes at least one anionic self-emulsification ether polyurethane, and the second pigment ink includes at least one styrene acrylic resin emulsion.

In another embodiment, acid value A (mgKOH/g) of the anionic self-emulsification polyether urethane, and acid value B (mgKOH/g) of the styrene acrylic resin emulsion satisfy following relation: $50 \leq |A-B| \leq 200$.

In a different embodiment, the first pigment ink includes at least one ink selected from the group consisting of a black pigment ink and a magenta pigment ink, and the second pigment ink includes at least one ink selected from the group consisting of a yellow pigment ink and a cyan pigment ink.

The first pigment ink can comprise at least one black pigment ink which contains from 0.01 parts to 0.5 parts of a sodium naphthalenesulfonate formalin condensate per 1 part of the first pigment ink, and an amount of a dimer, a trimer, and a tetramer of the sodium naphthalenesulfonate formalin condensate is from 20% to 80% by mass per the total mass of monomers and all multimers of the sodium naphthalenesulfonate formalin condensate.

In a different embodiment, the ink set comprises the cyan pigment ink, the magenta pigment ink, and the yellow pigment ink each of which contains a surfactant having the following formula (1):

(1)

wherein R is a C1-20 alkyl group, a C1-20 allyl group, or a C1-20 aralkyl group; l is an integer of 0 to 7; and n is an integer of 20 to 200 in the formula (1), wherein $(R)_l$ may be the same or different.

The ink set can comprise the cyan pigment ink, the magenta pigment ink, and the yellow pigment ink each of which contains a surfactant having the following formula (2):

(2)

wherein R is a C1-20 alkyl group, a C1-20 allyl group, or a C1-20 aralkyl group; l is an integer of 0 to 2; and n is an integer of 30 to 50 in the formula (2), wherein $(R)_l$ may be the same or different.

A different embodiment is directed to an ink cartridge comprising a first container containing the first pigment ink and a second container containing the second pigment ink.

In another embodiment, an image forming device comprises the ink cartridge, and a first recording head for ejecting the first pigment ink and a second recording head for ejecting the second pigment ink to form an image, wherein the first pigment ink and the second pigment ink are supplied from the ink cartridge.

A different embodiment includes a method for forming an image on a substrate comprising applying the first pigment ink and the second pigment ink to the substrate.

In a different embodiment, a printed substrate comprises a composition produced by drying the first pigment ink and second pigment ink. The printed substrate can be paper.

DETAILED DESCRIPTION OF THE INVENTION

An inkjet ink set of one embodiment includes (1) a first pigment ink and a second pigment ink, wherein the first pigment ink includes an anionic self-emulsification ether polyurethane, and the second pigment ink includes a styrene acrylic resin emulsion.

In another embodiment (2), the ink set according to (1) includes acid value A (mg/KOH/g) of the anionic self-emulsification polyether urethane, and acid value B (mg/KOH/g) of the styrene acrylic resin emulsion which satisfy the relation:

$$50 \leq |A-B| \leq 200.$$

In yet another embodiment (3), the ink set according to (1) includes the first pigment ink containing at least one of a black pigment ink and a magenta pigment ink, and the second pigment ink containing at least one of a yellow pigment ink and a cyan pigment ink.

In a different embodiment (4), the ink set according to (3) includes the black pigment ink containing from 0.01 parts to 0.5 parts of a sodium naphthalenesulfonate formalin condensate per 1 part of the first pigment ink, and the amount of a dimer, a trimer, and a tetramer of the sodium naphthalenesulfonate formalin condensate is from 20% to 80% by mass per the total mass of monomers and all multimers of the sodium naphthalenesulfonate formalin condensate.

In a different embodiment (5), the ink set according to (3) includes the cyan pigment ink, the magenta pigment ink, and the yellow pigment ink each of which containes a surfactant having the following formula (1):

(1)

wherein R is a C1-20 alkyl group, a C1-20 allyl group, or a C1-20 aralkyl group; l is an integer of 0 to 7; and n is an integer of 20 to 200 in the formula (1), and wherein $(R)_l$ can be the same or different.

In another embodiment (6), the ink set according to (3) includes the cyan pigment ink, the magenta pigment ink, and the yellow pigment ink each of which containes a surfactant having the following formula (2):

(2)

wherein R is a C1-20 alkyl group, a C1-20 allyl group, or a C1-20 aralkyl group; l is an integer of 0 to 2; and n is an integer of 30 to 50 in the formula (2), and wherein $(R)_l$ can be the same or different.

In a different embodiment (7), an ink cartridge includes a first container containing the first pigment ink and a second container containing the second pigment ink, as defined in (1).

In yet another embodiment (8), an image forming device includes an ink cartridge, as defined in (7), a first recording head for ejecting the first pigment ink and as second recording head for ejecting the second pigment ink to form an image, wherein the first pigment ink and the second pigment ink is supplied from the ink cartridge.

In a different embodiment (9), a method for forming an image on a substrate including applying the first pigment ink and the second pigment ink, as defined in (1), to the substrate, is provided.

In another embodiment (10), a printed substrate includes a composition produced by drying the first pigment ink and the second pigment ink, as defined in (1).

In yet another embodiment (11), the printed substrate can be paper.

<Resin Emulsion>

A resin emulsion has a property to aggregate or increase its viscosity to prevent a colorant from penetrating into a medium, when inkjet ink lands on the image support medium such as paper. Thus, fixing the colorant is promoted. In addition, the resin emulsion forms a coating on the paper to increase abrasion-resistance of the printed substance. In one embodiment, a polyurethane resin emulsion and a styrene acrylic resin emulsion are used as the resin emulsion.

<Polyurethane Resin Emulsion>

A polyurethane resin includes a polyurethane backbone having a main chain composed of monomers linked to the urethane bonding. The polyurethane resin is preferably a water-dispersible polyurethane resin.

The water-dispersible polyurethane resin may be a water dispersion of the polyurethane resin obtained by either introducing a hydrophilic component into the main chain of the polyurethane backbone for stabilizing the dispersion thereof in water and dispersing the hydrophilic compound-introduced polyurethane resin, or, by using an external emulsifier for stabilizing the dispersion. The polyurethane resin is preferably a self-dispersible (self-emulsifying) water-dispersible polyurethane resin having a hydrophilic component introduced into the main chain.

Examples of a self-emulsifying polyurethane resin include various water-dispersible polyurethane resins such as an ester polyurethane resin, ether polyurethane resin, carbonate polyurethane resin, or a combination thereof, wherein the water-dispersible polyurethane resins are obtained by reacting a diisocyanate compound with a diol compound such as a polyether diol, polyester diol, polycarbonate diol, or a combination thereof, and an acid-group-containing diol such as a diol containing a carboxylic acid group, a sulfonic acid group, or a combination thereof. In one embodiment, the self-emulsification type ether polyurethane is preferably used. One or more resins can be used.

Examples of the aforementioned diisocyanate compounds include aliphatic diisocyanate compounds such as hexamethylene diisocyanate and 2,2,4-trimethylhexamethylene diisocyanate; alicyclic diisocyanate compounds such as isophorone diisocyanate, hydrogenated xylylene diisocyanate, 1,4-cyclohexane diisocyanate, and 4,4'-dicyclohexylmethane diisocyanate; aroma-aliphatic diisocyanate compounds such as xylylene diisocyanate and tetramethylxylylene diisocyanate; aromatic diisocyanate compounds such as toluoylene diisocyanate and phenylmethane diisocyanate; and modified products of these diisocyanates such as carbodiimide-modified, urethdione-modified, and urethimine-modified diisocyanates. One or more diisocyanate compounds can be used.

Examples of the diol compounds include polyether diols such as polyethylene glycol, polypropylene glycol, polytetramethylene ether glycol, and polyhexamethylene ether glycol; polyester diols such as poly(ethylene adipate), poly(butylene adipate), poly(neopentyl adipate), poly(3-methylpentyl adipate), poly(ethylene/butylene adipate), and poly(neopentyl/hexyl adipate); a polylactone diol such as polycaprolactone diol; and polycarbonate diols. From the viewpoint of ink storage stability, the diol compound can be a polyether diol compound, a polyester diol compound, or a polycarbonate diol compound, preferably a polyether diol compound or a polycarbonate diol compound, and more preferably, a polyether diol compound. The diol compounds may be used singly or in combination. The polyether diol compound and the polycarbonate diol compound are resistant to denaturation caused by hydrolysis occurring in water, and thereby have excellent storage stability.

Examples of the acid-group containing diols include dimethylol acetic acid, dimethylol butanoic acid, dimethylol propionic acid, and dimethylol butyric acid. In particular, dimethylol butanoic acid is preferred. One or more acid-group containing diols can be used.

A method for synthesizing a polyurethane resin is not particularly limited, and may include known methods such as a method of using a solution, a method of using a prepolymer, a hot-melting method, a method of using a urethane prepolymer in water as an emulsifier aqueous soluvent and a chain extender, a method of using sulfonation, or a method of using a block isocyanate.

The method that uses a solution includes synthesizing a prepolymer having a terminal isocyanate in a solvent having a low boiling point, which is unreactive to the isocyanate group, such as acetone; introducing a hydrophilic group using, e.g., a diamine and/or a polyol; inverting the phase by diluting with water; and distilling the solvent to obtain the polyurethane dispersion.

The method that uses a prepolymer includes synthesizing the prepolymer having a terminal isocyanate including a hydrophilic group; dispersing it into water; and extending the chain using an amine.

The method that uses sulfonation includes sulfonating an aromatic ring of a urethane prepolymer having a free isocyanate group obtained from a hydrophobic polyol and an aromatic polyisocyanate.

When a prepolymer method that uses a low-molecular weight polyhydric compound is employed, the low-molecular weight polyhydric compound is, for example, at least one diol compound as mentioned above for a component of polyurethane and its adduct with a small molar amount of alkylene oxide, and at least one triol compound, such as glycerin, trimethylolethane, and trimethylolpropane, and its adduct with a small molar amount of the alkylene oxide.

For a method of producing an aqueous polyurethane resin, a method of subjecting a polyurethane prepolymer prepared in an organic solvent phase to phase inversion, emulsifying the polyurethane prepolymer, and further extending chains of the polyurethane in a water phase, is generally known. For a chain extender in this case, a polyamine such as diamine can be used.

After acid groups derived from dimethylol alkanoic acids have been neutralized, the polyurethane prepolymer is extended with water, a diamine, or triamine while it is neutralized. Examples of the polyamine used for the chain extender in chain extension with an amine may include a diamine and/or a triamine, e.g., hexamethylenediamine, isophoronediamine, hydrazine, and piperazine.

However, when a polyurethane resin prepared with a polyamine serving as a chain extender is used in a recording liquid, storage stability of the recording liquid tends to be degraded. The fact that the polyurethane resin which is extended with an amine (a polyurethane resin containing a polyurethane urea part) tends to be hydrolyze, and the fact that a polyamine produced by the hydrolysis thereof serves as a flocculant in a pigment dispersion recording liquid, are likely to cause degradation of the storage stability of the recording liquid.

The polyurethane resin may be used as a salt of an alkaline metal such as Li, Na, and/or K, as an ammonium salt, or as a salt of an organic amine such as dimethylamine, and/or mono-, di-, and triethanolamine. These salts may be prepared by neutralizing the polyurethane resin obtained according to the above-mentioned methods. The base used for neutralizing the polyurethane resin may be appropriately selected depending on the type of a salt counter ion desired, and may be, for example, an alkylamine such as butylamine and/or triethylamine; an alkanolamine such as monoethanolamine, diethanolamine, and/or triethanolamine; morpholine; ammonia; and an inorganic base such as sodium hydroxide. One or more salts and one or more bases can be used.

<Styrene Acrylic Resin>

A styrene acrylic resin can be prepared in an aqueous medium in accordance with known free-radical emulsifying polymerization methods, by using one type of monomers so as to form a homopolymer or using two or more types of monomers so as to form a copolymer. A polymer containing a monomer capable of forming a water-insoluble homopolymer is preferable as well as a copolymer of such monomers. The polymer may include a monomer capable of forming a water-insoluble homopolymer, provided that the polymer composition is sufficiently water-insoluble on the whole enough to form latex. These polymers can be prepared by emulsion polymerization, solution polymerization, suspension polymerization, dispersion polymerization, ionic polymerization (e.g., cationic and anionic), atomic transfer radical polymerization and other polymerization methods known in the technical field of polymerization.

Examples of the polymer include a styrene acrylic resin prepared by a free radical polymerization of a vinyl monomer in aqueous emulsion. The polymer latex is preferably a homopolymer, copolymer or cross-linked polymer each containing a hydrophobic unsaturated ethylene monomer(s) capable of forming a water-insoluble homopolymer. Also, a copolymer of monomers containing hydrophilic unsaturated ethylene monomer(s) is preferred, provided that the polymer composition is sufficiently water-insoluble on the whole enough to form a latex.

The styrene acrylic resins can be prepared by emulsion polymerization, dispersion polymerization, suspension polymerization, pulverization or solution/bulk polymerization. The details of the methods and stabilizers for the use can be found in "Emulsion Polymerization and Emulsion Polymer," P. A. Lovell, and M. S. El-Aasser, John Wiley & Sons Ltd., England, 1977), and are incorporated herein by reference in their entirety.

Examples of commercially available resin emulsions include: J-690, J-450, J-734, J-7600, J-352, J-390, J-7100, J-741, J-74J, J-511, J-840, J-775, HRC-1645, HPD-71, PDX-6102B, and JDX-5050 (styrene acrylic resin emulsion, manufactured by BASF JAPAN LTD.); UC-3900 (styrene acrylic resin emulsion, manufactured by Toagosei Co., Ltd.); AP4710 (acrylic silicone resin emulsion, manufactured by SHOWA HIGHPOLYMER CO., LTD.); SF460, SF460S, SF420, SF110, SF300, and SF361 (polyurethane resin emulsion, manufactured by Nippon Unicar Company Limited); and W-6020, W-5025, W-5661, and W-6010 (polyurethane resin emulsion, manufactured by Mitsui Chemicals, Inc.).

In one embodiment, the amount of resin emulsion is preferably from 0.1% by mass to 10% by mass, more preferably from 1% by mass to 5% by mass per th total amount of the inkjet ink. When the amount is less than 0.1% by mass, the abrasion resistance of image may be decreased. When the amount is more than 10% by mass, the jetting stability may be decreased.

In one embodiment, an ink set includes a first ink, having an anionic self-emulsification ether polyurethane resin, and a second ink, having a styrene acrylic resin emulsion, in combination. The inkjet ink satisfies the relation, 50≤|A−B|≤200, wherein A (mg/KOH/g) is the acid value of the anionic self-emulsification polyether urethane resin, and B (mgKOH/g) is the acid value of the styrene acrylic resin emulsion.

When the difference of the acid values between the anionic self-emulsification polyether urethane resin and the anionic self-emulsification polyether urethane is not less than 50 mgKOH/g, the resin emulsion becomes unstable to aggregate in contact with another emulsion. However, pigments do not tend to aggregate together and are stably dispersed, therefore the bleeding between colors is prevented. A difference of the acid values is preferably from 75 mgKOH/g to 200 mgKOH/g, more preferably from 100 mgKOH/g to 180 mgKOH/g, and even more preferably from 120 mgKOH/g to 160 mgKOH/g. When the difference is more than 200 mgKOH/g, the storage stability of the inkjet ink may be decreased.

The acid value of the anionic self-emulsification polyether urethane resin is preferably from 40 mgKOH/g to 100 mgKOH/g, more preferably from 40 mgKOH/g to 90 mgKOH/g, and even more preferably from 60 mgKOH/g to 80 mgKOH/g. The acid value of the styrene acrylic resin emulsion is preferably from 100 mgKOH/g to 250 mgKOH/g, more preferably from 200 mgKOH/g to 250 mgKOH/g, and even more preferably from 240 mgKOH/g to 250 mgKOH/g.

A dispersing agent used for black pigment ink is selected depending on the type of a carbon black.

When an anionic surfactant is used as the dispersant, examples thereof include surfactants such as alkyl sulfonate salt, alkylbenzene sulfonate salt, alkylnaphthalene sulfonate salt, a sodium naphthalene sulfonate-formalin condensate, alkane or olefin sulfonate salt, alkyl sulfate, polyoxyethylene alkyl or alkylaryl ether sulfate salt, alkyl phosphate salt, alkyldiphenyl ether disulfonate salt, ether carboxylate, alkyl sulfosuccinate salt, α-sulfofatty acid ester, and fatty acid salt; condensates of higher fatty acid and amino acid; and naphthenate. One or more surfactants can be used.

When a nonionic surfactant is used as the dispersant, examples thereof include polyoxyethylene alkyl ether such as polyoxyethylene lauryl ether, polyoxyethylene myristyl ether, polyoxyethylene cetyl ether, polyoxyethylene stearin ether, and polyoxyethylene oleyl ether; polyoxyethylene alkylphenyl ether, such as polyoxyethylene octylphenyl ether, and polyoxyethylene nonylphenyl ether; and others such as polyoxyethylene α-naphthyl ether, polyoxyethylene β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and a polyoxyethylene-polyoxypropylene block copolymer. One or more surfactants can be used.

An aromatic sulfonate salt such as a sodium naphthalene sulfonate-formalin condensate is preferably used as the anionic surfactant, because it provides desirable dispersibility to a carbon black, and has a suitably foaming property.

The aromatic sulfonate salt is prepared by introducing sulfonic acid into an aromatic compound, and neutralizing the resulting aromatic compound with a basic compound. Examples of the aromatic compound to which the sulfonic acid has been introduced include benzene sulfonic acid, p-toluene sulfonic acid, naphthalene sulfonic acid, alkylnaphthalene sulfonic acid, and a combination thereof. Examples of the basic compound include alkyl amines such as butyl amine, and triethyl amine; alkanolamines such as monoethanolamine, diethanolamine, triethanolamine, and triisopropanolamine; and others such as morpholine, ammonia water, sodium hydroxide, lithium hydroxide, potassium hydroxide, aminomethyl propanediol, aminoethyl propanediol, and choline. As the basic compound, moreover, a buffer agent such as tris(hydroxylmethyl)aminomethane, and good buffer may be used. One or more basic compounds can be used. Furthermore, a compound in which the aromatic sulfonate salt is condensed with formalin may be also used as the basic compound.

The sodium naphthalene sulfonate-formalin condensate is particularly not limited, provided that it is a condensation product of sodium naphthalene sulfonate and formaldehyde, formed of a repeat unit of the sodium naphthalene sulfonate-formalin condensate. The amount of a dimer, a trimer, and a tetramer of the sodium naphthalenesulfonate formalin condensate is preferably from 20% by mass to 80% by mass per the total amoun of monomers and all multimers of the sodium naphthalenesulfonate formalin condensate, and more preferably from 30% by mass to 70% by mass, and even more preferably from 40 to 60% by mass.

When the amount is less than 20% by mass, the storage stability of the inkjet ink may be decreased. When the amount is more than 80% by mass, the jetting stability may be decreased.

The naphthalenesulfonate formaldehyde condensate may be obtained as described below.

First, for obtaining naphthalenesulfonic acid, sulfuric acid is used in a molar ratio of 1.2-1.4 mols per 1 mol of naphthalene, and reacted at 150° C. to 165° C. for 2 to 5 hours to obtain a sulfonated product. Then, 0.95 to 0.99 mol of formalin is added dropwise as formaldehyde to 1 mol of the sulfonated product at 85° C. to 95° C. over 3 to 6 hours, and subjected to condensation reaction at 95° C. to 105° C. [step (1)]. Water, a neutralizing agent (for example, calcium carbonate) and sulfite are added to the condensate, thereby neutralizing it at 80° C. to 95° C. and simultaneously converting the unreacted aldehyde into a water-insoluble material [step (II) and neutralization]. From 1.0 to 1.1 times by mol of the neutralizing agent is added preferably to naphthalenesulfonic acid and unreacted sulfuric acid, respectively. The sulfite is added preferably in 0.5 mols to 5 mols excess relative to 1 mol of the unreacted formaldehyde. The amount of the unreacted formaldehyde in the reaction system can be measured according to a method described in the Examples below. Thereafter, in the step of removing a water-insoluble material in a conventional way, preferably by separation with filtration, [step (III)], an aqueous solution of a water-soluble salt of the naphthalenesulfonate formaldehyde condensate is obtained.

The amount of the dimer to the tetramer of the naphthalenesulfonate formaldehyde condensate can be adjusted by controlling the aforementioned condensation reaction.

In one embodiment, a dispersant is not limited as long as it can be used for color pigment ink. However, a surfactant shown in the formula (1) is preferably used as the dispersant in terms of making aqueous pigment ink having a small average particle diameter and small standard deviation relating to the particle diameter distribution:

(1)

In the formula (1), R is a C1-20 alkyl group, a C1-20 allyl group, or a C1-20 aralkyl group; l is an integer of 0 to 7; and n is an integer of 20 to 200, wherein $(R)_l$ can be the same or different.

In the formula (1), n is preferably from 20 to 100, more preferably from 30 to 50. When n is less than 20, the dispersion stability may be decreased, thus, sufficient color saturation may not be obtained due to the increase of the particle diameter or increase of the standard deviation relating to the particle diameter distribution. When n is more than 200, the viscosity of the inkjet ink may be increased, thus, it becomes difficult to print using the inkjet method. In the formula (1), l is preferably from 0 to 2.

The surfactant shown in the formula (1) is preferably a compound shown in the formula (2), more preferably polyoxyethylene (POE) (l=0, n=40) β-naphthylether:

(2)

In the formula (2), R is a C1-20 alkyl group, a C1-20 allyl group, or a C1-20 aralkyl group; l is an integer of 0 to 2; and n is an integer of 30 to 50, wherein $(R)_l$ can be the same or different.

The amount of the surfactant shown in the formula (1) is preferably from 6% to 40% by mass per the total amount of the inkjet ink, more preferably from 10% to 30% by mass, and even more preferably from 15% to 25% by mass. When the amount is outside the range, the storage stability of the inkjet ink may be decreased.

<Water-Soluble Organic Solvent>

A water-soluble organic solvent is suitably selected depending on the intended purpose without any restriction. Examples thereof include polyhydric alcohols such as ethylene glycol, diethylene glycol, 1,3-butylglycol, 3-methyl-1,3-butylglycol, triethylene glycol, polyethylene glycol, polypropylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ether such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methylformamide, N,N-dimethylformamide; amines such as monoethanol amine, diethanol amine, triethanol amine, monoethyl amine, diethyl amine, and triethyl amine; sulfone-containing compounds such as dimethyl sulfoxide, sulfolane, and thiodiethanol; and others such as propylene carbonate, and ethylene carbonate. The water-soluble organic solvents can be used independently or in combination of two or more.

In one embodiment, the boiling point of the water-soluble organic solvent is preferably not less than 180° C. When such the water-soluble organic solvent is included in the inkjet ink, water retention and wettability of the inkjet ink are provided, thus, excellent storage stability may be realized without aggregation or increase of viscosity, when the inkjet ink is stored for a long period of time. In addition, even when the inkjet ink at a peak of a nozzle is left in the open state, the dry substance maintains its flowability for a long time. Moreover, the clogging of the nozzle may not occur, and high jetting stability may be obtained in printing or at the reboot after the printing.

Among the water-soluble organic solvents, diethylene glycol, 2-ethyl-1,3-hexanediol, 2-buthyl-2-ethyl-1,3-propanediol, glycerin, and a combination thereof are preferred to prevent defects of the jetting property caused by water evaporation such as clogging due to ink drying, and to increase color saturation of the image.

More preferably, 2-ethyl-1,3-hexanediol, 2-buthyl-2-ethyl-1,3-propanediol, and a combination thereof can be used to prevent bleeding by increasing permeability with keeping the pigments on the surface of the medium, and to obtain an image having a high image density without penetration by the pigments to the other side of the medium.

The amount of the water-soluble organic solvent is preferably from 0.1% by mass to 50% by mass per the total amount of the inkjet ink. Particularly, when 2-ethyl-1,3-hexanediol (EHD) is used, the amount is preferably from 0.5% by mass to 3.0% by mass. When 2-buthyl-2-ethyl-1,3-propanediol (BEPD) is used, the amount is preferably from 0.1% by mass to 2.0% by mass, more preferably from 0.1% by mass to 1.5% by mass, even more preferably from 0.5% by mass to 1.2% by mass. When the amount is within the above range, bleeding is effectively prevented by increasing the permeability with keeping the pigment on the surface, thus an image having a high image density without penetration by the pigments to the other side of the medium may be obtaind. In addition, precipitation of the water-soluble organic solvent does not occur.

The pigment used in one embodiment includes a black pigment, a color pigment such as a magenta pigment, a cyan pigment, and a yellow pitment. One or more pigments can be used.

Examples of the black pigment include carbonblacks manufactured by a furnace method or a channel method.

Examples of the magenta pigment include Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 148, Pigment Red 168, Pigment Red 176, Pigment Red 184, Pigment Red 185, Pigment Red 202, and Pigment Violet 19. One or more pigments can be used.

Examples of the cyan pigment include Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Pigment Blue 63, and Pigment Blue 66. One or more pigments can be used.

Examples of the yellow pigment include Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, Pigment Yellow 174, and Pigment Yellow 180. One or more pigments can be used.

Also, a combination of the above pigments can be used.

The average particle diameter (D50) of pigment particles is preferably not more than 150 nm, more preferably from 20 to 120 nm, and even more preferably from 50 to 100 nm. When the average particle diameter is within the above range, irregular reflection may be prevented, and printed image having a homogeneous image density may be obtained.

When the average particle diameter is more than 150 nm, pigment particles on the printed image generate irregular reflection, therefore the color saturation of the image may be decreased, and the image having an inhomogeneous image density may be obtained.

The average particle diameter (D50) is more preferably not more than 100 nm, because a better prevention of the irregular reflection may be obtained.

In one embodiment, the average particle diameter of pigment particles is measured by a particle size distribution measuring apparatus, e.g., UPA manufactured by NIKKISO CO., LTD. at of 23° C. and 55% RH.

The amount of a pigment is preferably from 0.1% by mass to 20% by mass, more preferably from 5% by mass to 10% by mass, per the total amount of the inkjet ink. When the amount is less than 0.1% by mass, the coloring power may be inadequate. When the amount is more than 20% by mass, the storage stability may be decreased, and the viscosity of the inkjet ink in the dried state may be increased.

<Additives>

An inkjet ink may optionally include a defoaming agent, pH adjuster, antiseptic agent, antifungal agent, antirust, antioxidant, ultraviolet absorber, or a combination thereof.

The defoaming agent is not particularly limited but may include a silicone defoaming agent, a polyether defoaming agent, a fatty acid ester defoaming agent, or a combination thereof. These defoaming agents may be used singly or in combination of two or more. Among the defoaming agents, a silicone defoaming agent is preferred in terms of breaking foam.

The pH adjuster is not particularly limited, as long as the pH may be adjusted to not less than 7, but may include amines such as diethanolamine, triethanolamine, or a combination thereof; hydroxides of alkali metal such as lithium hydroxide, sodium hydroxide, potassium hydroxide, or a combination thereof; carbonates of alkali metal such as lithium carbonate, sodium carbonate, potassium carbonate, or a combination thereof; ammonium hydroxide, quaternary ammonium hydroxide, quaternary phosphonium hydroxide, or a combination thereof. One or more pH adjusters can be used.

The antiseptic agent or the antifungal agent is not particularly limited but may include 1,2-benzisothiazoline-3-on, sodium dehydroacetate, sodium sorbate, sodium 2-pyridinethiol-1-oxide, sodium benzoate, sodium pentachlorophenol, or a combination thereof.

The antirust is not particularly limited but may include acidic sulfite, sodium thiosulfate, ammonium thiodiglycolic acid, diisopropyl ammonium nitrite, pentaerythritol tetranitrate, dicyclohexylammonium nitrite, or a combination thereof.

The antioxidant is not particularly limited but may include phenol antioxidant including hindered phenol antioxidant, amine antioxidant, sulfur antioxidant, phosphorus antioxidant, or a combination thereof.

The ultraviolet absorber is not particularly limited but may include oxybenzone, phenyl salicylate, p-aminobenzoate, or a combination thereof.

The inkjet ink according to one embodiment may be prepared by mixing the aforementioned ingredients. Coarse particles and foreign substances such as dust and/or trash may be removed by pressure filtration or filtration under reduced pressure using a metallic filter or a membrane filter; or by centrifugal filtration using a centrifugal filter. One or more removal methods can be used.

A suitable recording medium according to one embodiment is not particularly limited and can be appropriately selected depending on the purpose. The recording medium may be an ink-absorbable material such as paper, an ink-unabsorbable material, or a combination thereof.

Examples of the recording medium include sheets of plastics having a base material such as polyethylene terephthalate, polycarbonate, polypropylene, polyethylene, polysulfone, ABS resins, polyvinyl chloride resins, or a combination thereof; metal coated sheets in which a metal layer is formed on a non-metal material or metal material such as brass, iron, aluminum, stainless steel, copper, or a combination thereof, using a method such as vapor deposition; papers subjected to water-repellent treatment; ceramics which are prepared by sintering inorganic materials at a high temperature. Among these materials, papers are more preferable because the cost is relatively low and images formed thereon look natural. One or more recording matetials can be used.

<Inkjet Recording Apparatus>

In one embodiment, a inkjet recording apparatus which is applicable for cleaning filling liquid is described hereinafter.

Figure 1:
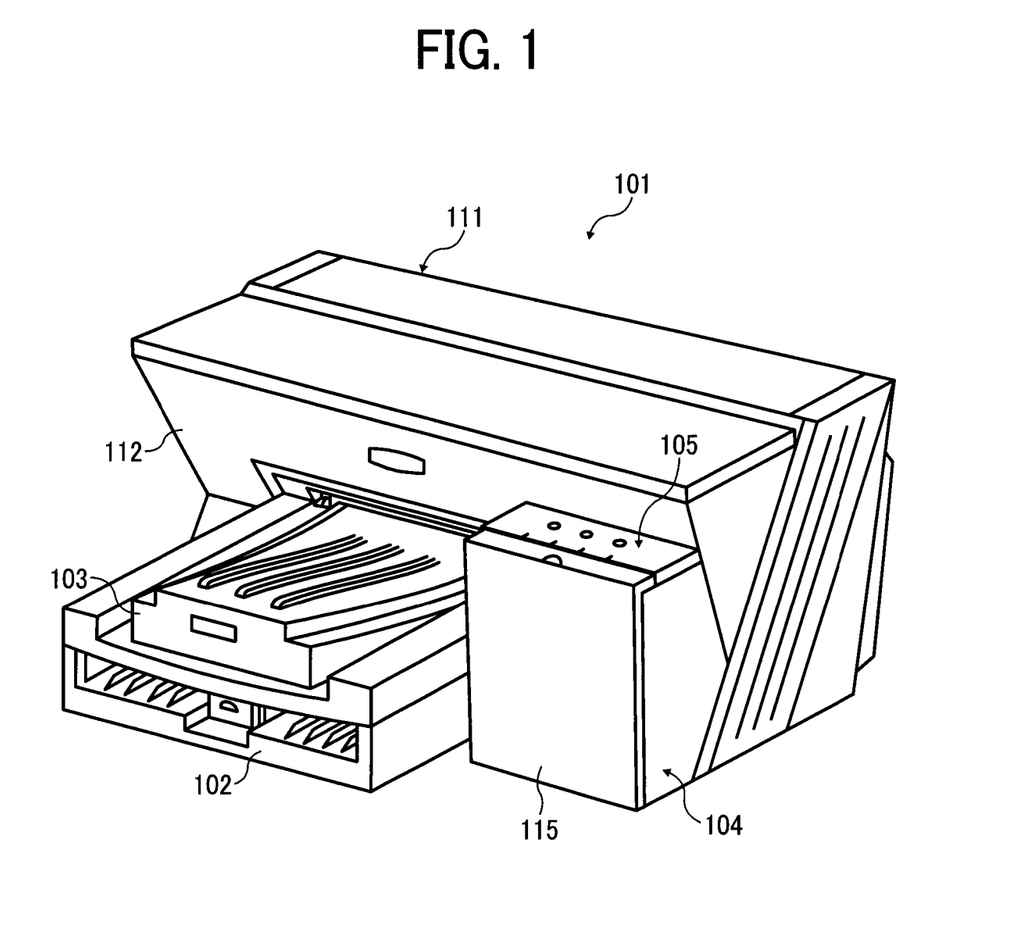
FIG. 1 shows a perspective view of an inkjet recording apparatus.

An inkjet recording apparatus shown in FIG. 1 includes an apparatus body 101, a feeder tray 102 attached to the apparatus body 101 for feeding paper, a paper output tray 103 attached to the apparatus body 101 for receiving paper on which images are recorded or formed, and an ink cartridge mounting part 104. An operation part 105 having operation keys and indicators is provided on the top surface of the ink cartridge mounting part 104. The ink cartridge mounting part 104 has a front cover 115 that can be opened or closed to remove or place ink cartridges 200. In addition, the apparatus body 101 has an upside cover 111 and a forehead of the front cover 112.

Figure 2:
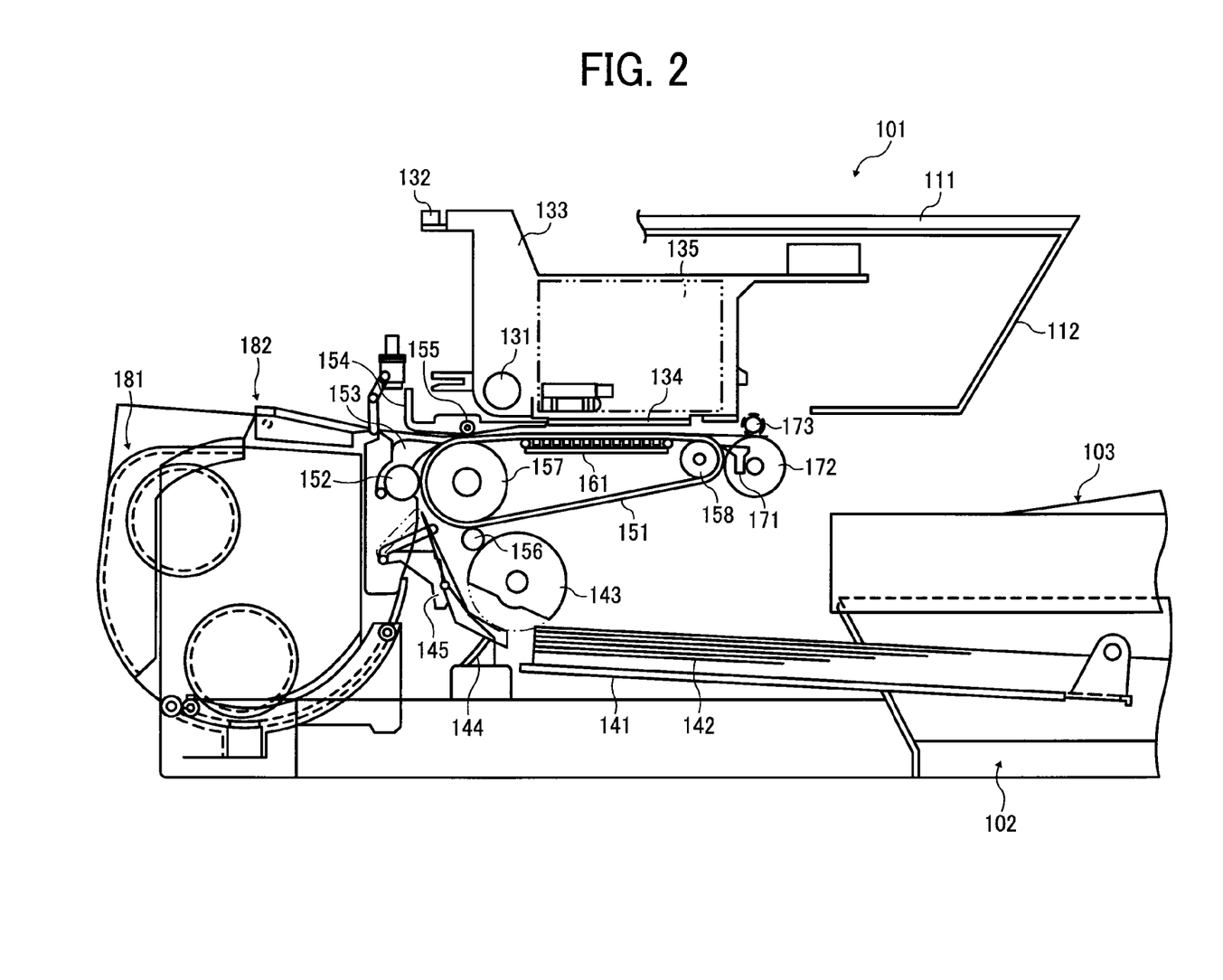
FIG. 2 schematically shows an example of the entire construction of the inkjet recording apparatus.
Figure 3:
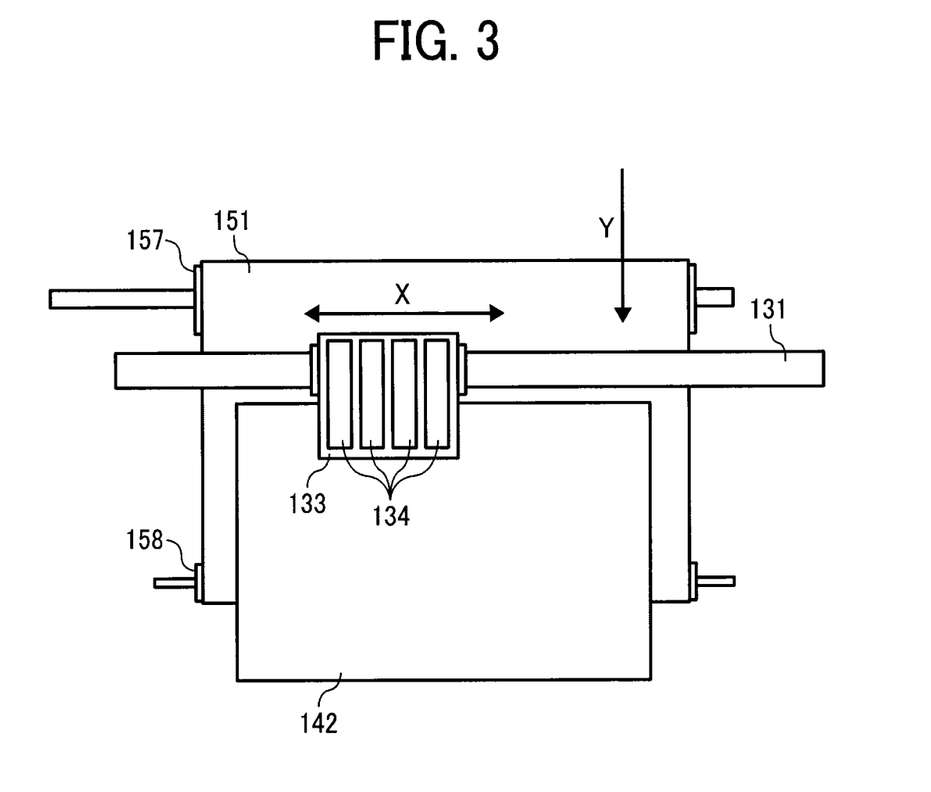
FIG. 3 schematically shows an enlarged view of an example of an inkjet head suitable for the use in the inkjet recording apparatus.

As shown in FIG. 2 to 3, a carriage 133 is supported slidably in the scan direction by a guide rod 131 that is a guide member laid across right and left side plates and stay 132 and is moved by a main motor in the arrowed directions (X) for scanning within the apparatus body 101.

Recording heads 134 including four inkjet recording heads that eject yellow (Y), cyan (C), magenta (M), and black (B) recording ink droplets, respectively, have ink ejection ports arranged in the intersecting direction with the main scanning direction and they are placed in the carriage 133 with their ink ejection direction downward.

Inkjet recording heads constituting the recording heads 134 are provided with an energy generation unit for ejection of the ink such as a piezoelectric actuator such as a piezoelectric element, a thermal actuator using an electrothermal conversion element such as an exothermic resistor to cause film boiling and, accordingly, phase change of liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the ink from the ink cartridge 200 mounted in the ink cartridge mounting part 105 via a ink supply tube.

A paper feed part for feeding paper 142 stuck on the paper load part 141, i.e., platen, of the feed tray 102 includes a half-moon roller, i.e., a feed roller 143, that separates and supplies the paper 142 from the paper load part 141 one by one and a separation pad 144 that faces the feed roller 143 and is made of a large friction coefficient material. The separation pad 144 is biased toward the feed roller 143.

A conveying part for conveying the paper 142 supplied from the feed part underneath the recording heads 134 includes a conveying belt 151 for electrostatically adsorbing and conveying the paper 142, a counter roller 152 for conveying the paper 142 sent from the paper feed part via a guide 145 by clamping it together with the conveying belts 151, a conveying guide 153 for turning the paper 142 sent nearly vertically by 90° so as to lay it on the conveying belt 151, and a leading end pressure roller 155 that is biased toward the conveying belt 151 by a presser member 154. A charging roller 156 that is a charging unit for charging the surface of the conveying belt 151 is also provided.

The conveying belt 151 is an endless belt, being placed over a conveying roller 157 and a tension roller 158 and running around in the belt conveying direction (Y). For example, the conveying belt 151 has a front layer that is a paper adsorbing surface made of a dragging-uncontrolled resin, for example, a copolymer of tetrafluoroethylene and ethylene (ETFE), having a thickness of 40 μm, and a back layer, i.e., an intermediate dragging layer or an earth layer, made of the same material as the front layer, but dragging-controlled with carbon. A guide member 161 is provided behind the conveying belt 151 at the corresponding position to the printing area by the recording heads 134. An output part for discharging the paper 142 on which recording was done by the recording heads 134 includes a separation click 171 for separating the paper 142 from the conveying belt 151, a paper output roller 172, and a paper output roller 173. The paper output tray 103 is disposed below the paper output roller 172.

A double-side feeding unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. The manual feeder 182 is provided on the top surface of the double-side feed unit 181.

In the inkjet recording apparatus, the paper 142 is separated and is fed from the paper feed part one by one. Being fed vertically, the paper 142 is guided by the guide 145 and is conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are ejected on the paused paper 142 for recording one-line. Then, the paper 142 is conveyed at a certain rate for recording the next line. The receiving of a recording end signal or a signal indicating that the rear end of the paper 142 has reached the recording area, terminates the recording operation and the paper 142 is ejected into the paper output tray 103.

When it is detected that the remaining amount of the recording ink in the subtank 135 nears an end, a certain amount of the recording ink is supplied to the subtank 135 from the ink cartridge 200.

In the inkjet recording apparatus, when the recording ink in the ink cartridge 200 is used up, the case of the ink cartridge 200 is disassembled and only the ink pouch contained therein can be exchanged. The ink cartridge 200 allows for the stable supplying of the recording ink even in a vertical and front mounting structure. Therefore, when the apparatus body 101 is installed with the top being blocked by something, for example, the ink cartridge 200 can be housed in a rack. Even when something is placed on the top surface of the apparatus body 101, the ink cartridge 200 can be easily replaced.

Here, the explanation is made with reference to an application in a serial type, i.e., shuttle type, inkjet recording apparatus in which the carriage scans is described. A line type inkjet recording apparatus having a line head is also applicable.

The inkjet ink of one embodiment is applicable to various recording in an inkjet recording system such as inkjet recording printers, facsimiles, copy machines, and printer/fax/copy complex machines.

Figure 4:
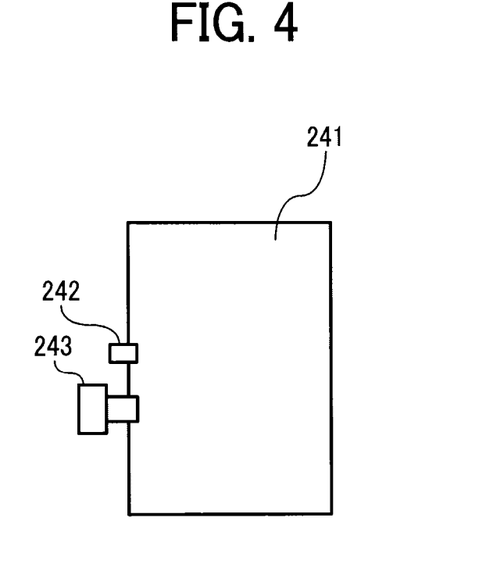
FIG. 4 schematically shows an example of a casing of an ink cartridge.
Figure 5:
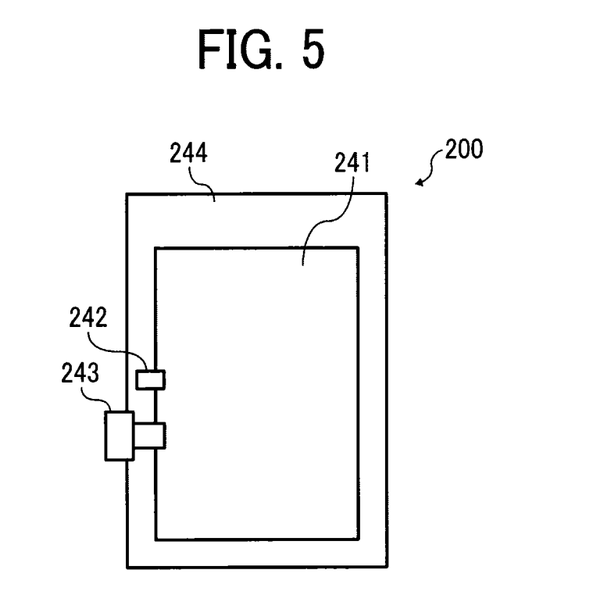
FIG. 5 schematically shows the exterior of the ink cartridge of FIG. 4 including the casing.

An ink cartridge is hereinafter described with reference to FIGS. 4 and 5. In an ink cartridge 200, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus. The ink pouch 241 is formed by a packaging member such as a non-permeable aluminum laminated film. The ink pouch 241 is housed in a cartridge case 244 generally made of plastics and detachably mounted on various types of inkjet recording apparatuses.

EXAMPLES

Having generally described an object of the invention, a further understanding can be obtained by reference to certain specific examples which are provided herein for purposes of illustration only, and are not intended to be limiting unless otherwise specified. It is appropriate to give examples on possible implementation of the invention.

<Preparation of Black Pigment Ink 1>

25% by mass of Pigment Black 7, NIPEX150, manufactured by Degussa, based on the total mass of a black pigment dispersion was used.

5% by mass of the sodium naphthalenesulfonate formalin condensate, A-45-PN, manufactured by TAKEMOTO OIL & FAT Co., Ltd., based on the total mass of the black pigment dispersion was used, wherein the total amount of the sodium naphthalenesulfonate formalin condensate dimer, trimer, and tetramer was 5% by mass based on the total mass of monomers and multimers of the sodium naphthalenesulfonate formalin condensate. The remainder of the black pigment dispersion was purified water.

This aforementioned mixture was preliminarily mixed to obtain mixed slurry. Then, the mixture was dispersed by a disk-type media mill, a UAM type, manufatcuted by KOTOBUKI INDUSTRIES CO., LTD., using 0.015 mm Zirconia beads with the rim speed of 6 m/s at a liquid temperature of 10° C. and the filling rate of 70%, until the average particle diameter became a predetermined diameter. Next, coarse particles were separated by centrifugation using a centrifugal machine, Model-7700, manufactured by KUBOTA Corporation, and then filtrated using a filter having a diameter of 1.2 μm to obtain the black pigment dispersion.

5.0% by mass of the aforementioned black pigment dispersion (based on the solid content) was used in the pigment ink. The pigment ink further comprised 7.5% by mass glycerin, 15.0% by mass of diethylene glycol, 3.0% by mass of 2-ethyl-1,3-hexanediol, and 3.0% by mass of 2-pyrrolidone, wherein the mass % is based on the total mass of the pigment ink.

0.5% by mass of sodium polyoxyethyrene (3) alkyl (C13) ether acetate based on the total mass of the pigment ink was further added.

2.0% by mass of the anionic self-emulsification ether polyurethane, XW-75-W932, manufactured by MITSUI CHEMICALS POLYURETHANES, INC., having the acid value of 80 was used. The remainder was purified water.

A pigment ink was prepared using components of the aforementioned ink prescription. After mixing the components for 30 minutes, the components were filtrated using a membrane filter having the average pore diameter of 0.8 μm to obtain black pigment ink 1.

<Preparation of Yellow Pigment Ink 2>

20% by mass of Pigment Yellow 74, Yellow NO. 43, manufactured by Dainichiseika Color & Chemicals Mfg. Co., based on the total mass of a yellow pigment dispersion was used.

The compound having the formula (1), manufactured by TAKEMOTO OIL & FAT Co., Ltd., l=0, n=40, was used at 7.5% by mass based on the toal mass of the dispersion. The remained was purified water.

This aforementioned mixture was preliminarily mixed to obtain mixed slurry. Then, the mixture was dispersed by a disk-type media mill, a UAM type, manufatcuted by KOTOBUKI INDUSTRIES CO., LTD., using 0.015 mm Zirconia beads with the rim speed of 6 m/s at a liquid temperature of 10° C. and the filling rate of 70%, until the average particle diameter became a predetermined diameter. Next, coarse particles were separated by centrifugation using a centrifugal machine, Model-7700, manufactured by KUBOTA Corporation, and then filtrated using a filter having a diameter of 1.2 μm to obtain the yellow pigment dispersion.

5.0% by mass of the aforementioned yellow pigment dispersion (based on the solid content) was used. The pigment ink further contained 7.5% by mass of glycerin, 15.0% by mass of diethylene glycol, 3.0% by mass of 2-ethyl-1,3-hexanediol, and 3.0% by mass Of 2-pyrrolidone, wherein the mass % is based on the total mass of the pigment ink.

0.5% by mass of sodium polyoxyethyrene (3) alkyl (C13) ether acetate was further added.

2.0% by mass of the styrene acrylic resin, J-690, manufactured by BASF, having the acid value of 240, was finally used. The remained of the pigment ink was purified water.

A pigment ink was prepared using components of the aforementioned ink prescription. After mixing the components for 30 minutes, the components were filtrated using a membrane filter having the average pore diameter of 0.8 μm to obtain yellow pigment ink 2.

<Preparation of Magenta Pigment Ink 3>

20% by mass of Pigment Red 122, CROMOPHTAL JET MAGENTA DMQ, manufactured by Ciba Specialty Chemicals Inc., based on the total mass of a Magenta pigment dispersion, was used.

A compound having the formula (1), manufactured by TAKEMOTO OIL & FAT Co., Ltd., l=0, n=40, was used at 7.5% by mass based on the total mass of the dispersion. The remainder of the pigment dispersion was purified water.

The aforementioned mixture was preliminarily mixed to obtain mixed slurry. Then, the mixture was dispersed by a disk-type media mill, a UAM type, manufatcuted by KOTOBUKI INDUSTRIES CO., LTD., using 0.015 mm Zirconia beads with the rim speed of 6 m/s at a liquid temperature of 10° C. and the filling rate of 70%, until the average particle diameter became a predetermined diameter. Next, coarse particles were separated by centrifugation using a centrifugal machine, Model-7700, manufactured by KUBOTA Corporation, and then filtrated using a filter having a diameter of 1.2 μm to obtain the Magenta pigment dispersion.

5.0% by mass of the aforementioned Magenta pigment dispersion (based on the solid content) was used to prepare Magenta pigment ink 3. The pigment ink further contained 7.5% by mass of glycerin, 15.0% by mass of diethylene glycol, 3.0% by mass of 2-ethyl-1,3-hexanediol, and 3.0% by mass of 2-pyrrolidone, wherein the mass % is based on the total mass of the pigment ink.

0.5% by mass of sodium polyoxyethyrene (3) alkyl (C13) ether acetate was further added. 2.0% by mass of the anionic self-emulsification ether polyurethane, XW-75-W932, manufactured by MITSUI CHEMICALS POLYURETHANES, INC., having the acid value of 80 was finally used. The remainder of the pigment ink was purified water.

A pigment ink was prepared using components of the aforementioned ink prescription. After mixing the components for 30 minutes, the components were filtrated using a membrane filter having the average pore diameter of 0.8 vim to obtain magenta pigment ink 3.

<Preparation of Cyan Pigment Ink 4>

20% by mass of Pigment Blue 15:3, CYANINE BLUE A-385, manufactured by Dainichiseika Color & Chemicals Mfg. Co., Ltd., based on the toal mass of a cyan pigment dispersion was used.

7.5% by mass of a compound having the formula (1), manufactured by TAKEMOTO OIL & FAT Co., Ltd., l=0, n=40 was further added. The remainder of the pigment dispersion was purified water.

This mixture was preliminarily mixed to obtain mixed slurry. Then, the mixture was dispersed by a disk-type media mill, a UAM type, manufatcuted by KOTOBUKI INDUSTRIES CO., LTD., using 0.015 mm Zirconia beads with the rim speed of 6 m/s at a liquid temperature of 10° C. and the filling rate of 70%, until the average particle diameter became a predetermined diameter. Next, coarse particles were separated by centrifugation using a centrifugal machine, Model-7700, manufactured by KUBOTA Corporation, and then filtrated using a filter having a diameter of 1.2 μm of to obtain the cyan pigment dispersion.

5.0% by mass of the aforementioned cyan pigment dispersion (based on the solid content) was used to prepare cyan pigment ink 4. The pigment ink further contained 7.5% by mass of glycerin, 15.0% by mass of diethylene glycol, 3.0% by mass of 2-ethyl-1,3-hexanediol, and 3.0% by mass of 2-pyrrolidone, wherein the mass % is based on the total mass of the pigment ink.

0.5% by mass of sodium polyoxyethyrene (3) alkyl (C13) ether acetate and 2.0% by mass of styrene acrylic resin, J-690, manufactured by BASF, having the acid value of 240, were then added, based on the total mass of the pigment ink. The remainder of the pigment ink was purified water.

A pigment ink was prepared using components of the aforementioned ink prescription. After mixing the components for 30 minutes, the components were filtrated using a membrane filter having the average pore diameter of 0.8 μm to obtain cyan pigment ink 4.

<Preparation of Black Pigment Ink 5>

Black pigment ink 5 was obtained in the same manner as in preparation of black pigment ink 1, provided that the sodium naphthalenesulfonate formalin condensate used in the black pigment dispersion of black pigment ink 1 was changed to the sodium naphthalenesulfonate formalin condensate, wherein the total amount of the sodium naphthalenesulfonate formalin condensate dimer, trimer, and tetramer was 20%, manufactured by TAKEMOTO OIL & FAT Co., Ltd., based on the total mass of the sodium naphthalenesulfonate formalin condensate monomers and all multimers.

<Preparation of Black Pigment Ink 6>

Black pigment ink 6 was obtained in the same manner as in preparation of black pigment ink 1, provided that the sodium naphthalenesulfonate formalin condensate used in the black pigment dispersion of black pigment ink 1 was changed to the sodium naphthalenesulfonate formalin condensate, wherein the total amount of the sodium naphthalenesulfonate formalin condensate dimer, trimer, and tetramer was 80%, manufactured by TAKEMOTO OIL & FAT Co., Ltd., based on the total mass of the sodium naphthalenesulfonate formalin condensate monomers and all multimers.

<Preparation of Black Pigment Ink 7>

Black pigment ink 7 was obtained in the same manner as in preparation of black pigment ink 1, provided that the sodium naphthalenesulfonate formalin condensate used in the black pigment dispersion of black pigment ink 1 was changed to the sodium naphthalenesulfonate formalin condensate, wherein the total amount of the sodium naphthalenesulfonate formalin condensate dimer, trimer, and tetramer was 19%, manufactured by TAKEMOTO OIL & FAT Co., Ltd., based on the total mass of the sodium naphthalenesulfonate formalin condensate monomers and all multimers.

<Preparation of Black Pigment Ink 8>

Black pigment ink 8 was obtained in the same manner as in preparation of black pigment ink 1, provided that the sodium naphthalenesulfonate formalin condensate used in the black pigment dispersion of black pigment ink 1 was changed to the sodium naphthalenesulfonate formalin condensate, wherein the total amount of the sodium naphthalenesulfonate formalin condensate dimer, trimer, and tetramer was 81%, manufactured by TAKEMOTO OIL & FAT Co., Ltd., based on the total mass of the sodium naphthalenesulfonate formalin condensate monomers and all multimers.

<Preparation of Black Pigment Ink 9>

Black pigment ink 9 was obtained in the same manner as in preparation of black pigment ink 1, provided that the amount of the sodium naphthalenesulfonate formalin condensate used in the black pigment dispersion of black pigment ink 1 was changed to 0.25% by mass, based on the toal mass of the pigment ink.

<Preparation of Black Pigment Ink 10>

Black pigment ink 10 was obtained in the same manner as in preparation of black pigment ink 1, provided that the amount of the sodium naphthalenesulfonate formalin condensate used in the black pigment dispersion of black pigment ink 1 was changed to 12.5% by mass, based on the toal mass of the pigment ink.

<Preparation of Black Pigment Ink 11>

Black pigment ink 11 was obtained in the same manner as in preparation of black pigment ink 1, provided that the amount of the sodium naphthalenesulfonate formalin condensate used in the black pigment dispersion of black pigment ink 1 was changed to 0.2% by mass, based on the toal mass of the pigment ink.

<Preparation of Black Pigment Ink 12>

Black pigment ink 12 was obtained in the same manner as in preparation of black pigment ink 1, provided that the amount of the sodium naphthalenesulfonate formalin condensate used in the black pigment dispersion of black pigment ink 1 was changed to 15% by mass, based on the toal mass of the pigment ink.

<Preparation of Yellow Pigment Ink 13>

Yellow pigment ink 13 was obtained in the same manner as in preparation of yellow pigment ink 2, provided that the compound, used in the yellow pigment dispersion in yellow pigment ink 2, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=200.

<Preparation of Yellow Pigment Ink 14>

Yellow pigment ink 14 was obtained in the same manner as in preparation of yellow pigment ink 2, provided that the compound, used in the yellow pigment dispersion in yellow pigment ink 2, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=20.

<Preparation of Yellow Pigment Ink 15>

Yellow pigment ink 15 was obtained in the same manner as in preparation of yellow pigment ink 2, provided that the compound, used in the yellow pigment dispersion in yellow pigment ink 2, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=300.

<Preparation of Yellow Pigment Ink 16>

Yellow pigment ink 16 was obtained in the same manner as in preparation of yellow pigment ink 2, provided that the compound, used in the yellow pigment dispersion in yellow pigment ink 2, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=10.

<Preparation of Yellow Pigment Ink 17>

Yellow pigment ink 17 was obtained in the same manner as in preparation of yellow pigment ink 2, provided that the compound, used in the yellow pigment dispersion in yellow pigment ink 2, having the formula (1), manufactured by TAKEMOTO OIL & FAT Co., Ltd., l=0, n=40, was changed to the water-soluble styrene acrylic resin, HPD-96, manufactured by BASF.

<Preparation of Magenta Pigment Ink 18>

Magenta pigment ink 18 was obtained in the same manner as in preparation of magenta pigment ink 3, provided that the compound, used in the magenta pigment dispersion in magenta pigment ink 3, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=200.

<Preparation of Magenta Pigment Ink 19>

Magenta pigment ink 19 was obtained in the same manner as in preparation of magenta pigment ink 3, provided that the compound, used in the magenta pigment dispersion in magenta pigment ink 3, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=20.

<Preparation of Magenta Pigment Ink 20>

Magenta pigment ink 20 was obtained in the same manner as in preparation of magenta pigment ink 3, provided that the compound, used in the magenta pigment dispersion in magenta pigment ink 3, having the formula (1), manufactured by TAKEMOTO OIL & FAT Co., Ltd., l=0, n=40, was changed to the compound having the formula (1), manufactured by TAKEMOTO OIL & FAT Co., Ltd., l=0, n=300.

<Preparation of Magenta Pigment Ink 21>

Magenta pigment ink 21 was obtained in the same manner as in preparation of magenta pigment ink 3, provided that the compound, used in the magenta pigment dispersion in magenta pigment ink 3, having structural formula (1), manufactured by TAKEMOTO OIL & FAT Co., Ltd., 1=0, n=40, was changed to the compound having structural formula (1), manufactured by TAKEMOTO OIL & FAT Co., Ltd., 1=0, n=10.

<Preparation of Magenta Pigment Ink 22>

Magenta pigment ink 22 was obtained in the same manner as in preparation of magenta pigment ink 3, provided that the compound, used in the magenta pigment dispersion in magenta pigment ink 3, having the formula (1), manufactured by TAKEMOTO OIL & FAT Co., Ltd., 1=0, n=40, was changed to the water-soluble styrene acrylic resin, HPD-96, manufactured by BASF.

<Preparation of Cyan Pigment Ink 23>

Cyan pigment ink 23 was obtained in the same manner as in preparation of cyan pigment ink 4, provided that the compound, used in the cyan pigment dispersion in cyan pigment ink 4, having the formula (1), manufactured by TAKEMOTO OIL & FAT Co., Ltd., 1=0, n=40, was changed to the compound having the formula (1), manufactured by TAKEMOTO OIL & FAT Co., Ltd., 1=0, n=200.

<Preparation of Cyan Pigment Ink 24>

Cyan pigment ink 24 was obtained in the same manner as in preparation of cyan pigment ink 4, provided that the compound, used in the cyan pigment dispersion in cyan pigment ink 4, having the formula (1), manufactured by TAKEMOTO OIL & FAT Co., Ltd., 1=0, n=40, was changed to the compound having the formula (1), manufactured by TAKEMOTO OIL & FAT Co., Ltd., 1=0, n=20.

<Preparation of Cyan Pigment Ink 25>

Cyan pigment ink 25 was obtained in the same manner as in preparation of cyan pigment ink 4, provided that the compound, used in the cyan pigment dispersion in cyan pigment ink 4, having the formula (1), manufactured by TAKEMOTO OIL & FAT Co., Ltd., 1=0, n=40, was changed to the compound having the formula (1), manufactured by TAKEMOTO OIL & FAT Co., Ltd., 1=0, n=300.

<Preparation of Cyan Pigment Ink 26>

Cyan pigment ink 26 was obtained in the same manner as in preparation of cyan pigment ink 4, provided that the compound, used in the cyan pigment dispersion in cyan pigment ink 4, having the formula (1), manufactured by TAKEMOTO OIL & FAT Co., Ltd., 1=0, n=40, was changed to the compound having the formula (1), manufactured by TAKEMOTO OIL & FAT Co., Ltd., 1=0, n=10.

<Preparation of Cyan Pigment Ink 27>

Cyan pigment ink 27 was obtained in the same manner as in preparation of cyan pigment ink 4, provided that the compound, used in the cyan pigment dispersion in cyan pigment ink 4, having the formula (1), manufactured by TAKEMOTO OIL & FAT Co., Ltd., 1=0, n=40, was changed to the water-soluble styrene acrylic resin, HPD-96, manufactured by BASF.

<Preparation of Yellow Pigment Ink 28>

Yellow pigment ink 28 was obtained in the same manner as in preparation of yellow pigment ink 2, provided that the amount of the compound, used in the yellow pigment dispersion in yellow pigment ink 2, having the formula (1), manufactured by TAKEMOTO OIL & FAT Co., Ltd., 1=0, n=40, was changed to 6.0% by mass.

<Preparation of Yellow Pigment Ink 29>

Yellow pigment ink 29 was obtained in the same manner as in preparation of yellow pigment ink 2, provided that the amount of the compound, used in the yellow pigment dispersion in yellow pigment ink 2, having the formula (1), manufactured by TAKEMOTO OIL & FAT Co., Ltd., 1=0, n=40, was changed to 40.0% by mass.

<Preparation of Yellow Pigment Ink 30>

Yellow pigment ink 30 was obtained in the same manner as in preparation of yellow pigment ink 2, provided that the amount of the compound, used in the yellow pigment dispersion in yellow pigment ink 2, having the formula (1), manufactured by TAKEMOTO OIL & FAT Co., Ltd., 1=0, n=40, was changed to 5.5% by mass.

<Preparation of Yellow Pigment Ink 31>

Yellow pigment ink 31 was obtained in the same manner as in preparation of yellow pigment ink 2, provided that the amount of the compound, used in the yellow pigment dispersion in yellow pigment ink 2, having the formula (1), manufactured by TAKEMOTO OIL & FAT Co., Ltd., 1=0, n=40, was changed to 45.0% by mass.

<Preparation of Magenta Pigment Ink 32>

Magenta pigment ink 32 was obtained in the same manner as in preparation of magenta pigment ink 3, provided that the amount of the compound, used in the magenta pigment dispersion in magenta pigment ink 3, having the formula (1), manufactured by TAKEMOTO OIL & FAT Co., Ltd., 1=0, n=40, was changed to 6.0% by mass.

<Preparation of Magenta Pigment Ink 33>

Magenta pigment ink 33 was obtained in the same manner as in preparation of magenta pigment ink 3, provided that the amount of the compound, used in the magenta pigment dispersion in magenta pigment ink 3, having the formula (1), manufactured by TAKEMOTO OIL & FAT Co., Ltd., 1=0, n=40, was changed to 40.0% by mass.

<Preparation of Magenta Pigment Ink 34>

Magenta pigment ink 34 was obtained in the same manner as in preparation of magenta pigment ink 3, provided that the amount of the compound, used in the magenta pigment dispersion in magenta pigment ink 3, having the formula (1), manufactured by TAKEMOTO OIL & FAT Co., Ltd., 1=0, n=40, was changed to 5.5% by mass.

<Preparation of Magenta Pigment Ink 35>

Magenta pigment ink 35 was obtained in the same manner as in preparation of magenta pigment ink 3, provided that the amount of the compound, used in the magenta pigment dispersion in magenta pigment ink 3, having the formula (1), manufactured by TAKEMOTO OIL & FAT Co., Ltd., 1=0, n=40, was changed to 45.0% by mass.

<Preparation of Cyan Pigment Ink 36>

Cyan pigment ink 36 was obtained in the same manner as in preparation of cyan pigment ink 4, provided that the amount of the compound, used in the cyan pigment dispersion in cyan pigment ink 4, having the formula (1), manufactured by TAKEMOTO OIL & FAT Co., Ltd., 1=0, n=40, was changed to 6.0% by mass.

<Preparation of Cyan Pigment Ink 37>

Cyan pigment ink 37 was obtained in the same manner as in preparation of cyan pigment ink 4, provided that the amount of the compound, used in the cyan pigment dispersion in cyan pigment ink 4, having the formula (1), manufactured by TAKEMOTO OIL & FAT Co., Ltd., 1=0, n=40, was changed to 40.0% by mass.

<Preparation of Cyan Pigment Ink 38>

Cyan pigment ink 38 was obtained in the same manner as in preparation of cyan pigment ink 4, provided that the amount of the compound, used in the cyan pigment dispersion in cyan pigment ink 4, having the formula (1), manufactured by TAKEMOTO OIL & FAT Co., Ltd., 1=0, n=40, was changed to 5.5% by mass.

<Preparation of Cyan Pigment Ink 39>

Cyan pigment ink 39 was obtained in the same manner as in preparation of cyan pigment ink 4, provided that the amount of the compound, used in the cyan pigment dispersion in cyan pigment ink 4, having the formula (1), manufactured by TAKEMOTO OIL & FAT Co., Ltd., l=0, n=40, was changed to 45.0% by mass.

<Preparation of Black Pigment Ink 40>

Black pigment ink 40 was obtained in the same manner as in preparation of black pigment ink 1, provided that the anionic self-emulsification ether polyurethane, XW-75-W932, manufactured by MITSUI CHEMICALS POLYURETHANES, INC., having the acid value of 80 was changed to the anionic self-emulsification ether polyurethane, W5661, manufactured by MITSUI CHEMICALS POLYURETHANES, INC., having the acid value of 48.

<Preparation of Black Pigment Ink 41>

Black pigment ink 41 was obtained in the same manner as in preparation of black pigment ink 1, provided that the anionic self-emulsification ether polyurethane, XW-75-W932, manufactured by MITSUI CHEMICALS POLYURETHANES, INC., having the acid value of 80 was changed to the anionic self-emulsification carbonate polyurethane, manufactured by MITSUI CHEMICALS POLYURETHANES, INC., having the acid value of 70.

<Preparation of Yellow Pigment Ink 42>

Yellow pigment ink 42 was obtained in the same manner as in preparation of yellow pigment ink 2, provided that the styrene acrylic resin, J-690, manufactured by BASF, having the acid value of 240, was changed to the styrene acrylic resin, manufactured by SEIKO PMC CORPORATION, having the acid value of 248.

<Preparation of Yellow Pigment Ink 43>

Yellow pigment ink 43 was obtained in the same manner as in preparation of yellow pigment ink 2, provided that the styrene acrylic resin, J-690, manufactured by BASF, having the acid value of 240, was changed to the styrene acrylic resin, manufactured by SEIKO PMC CORPORATION, having the acid value of 98.

<Preparation of Yellow Pigment Ink 44>

Yellow pigment ink 44 was obtained in the same manner as in preparation of yellow pigment ink 2, provided that the styrene acrylic resin, J-690, manufactured by BASF, having the acid value of 240, was changed to the styrene acrylic resin, manufactured by SEIKO PMC CORPORATION, having the acid value of 250.

<Preparation of Yellow Pigment Ink 45>

Yellow pigment ink 45 was obtained in the same manner as in preparation of yellow pigment ink 2, provided that the styrene acrylic resin, J-690, manufactured by BASF, having the acid value of 240, was changed to the styrene acrylic resin, manufactured by SEIKO PMC CORPORATION, having the acid value of 96.

<Preparation of Yellow Pigment Ink 46>

Yellow pigment ink 46 was obtained in the same manner as in preparation of yellow pigment ink 2, provided that the styrene acrylic resin, J-690, manufactured by BASF, having the acid value of 240, was changed to AP4710, acrylic silicone resin emulsion, manufactured by SHOWA HIGHPOLYMER CO., LTD.

<Preparation of Magenta Pigment Ink 47>

Magenta pigment ink 47 was obtained in the same manner as in preparation of magenta pigment ink 3, provided that the anionic self-emulsification ether polyurethane, XW-75-W932, manufactured by MITSUI CHEMICALS POLYURETHANES, INC., having the acid value of 80 was changed to the anionic self-emulsification ether polyurethane, W5661, manufactured by MITSUI CHEMICALS POLYURETHANES, INC., having the acid value of 48.

<Preparation of Magenta Pigment Ink 48>

Magenta pigment ink 48 was obtained in the same manner as in preparation of magenta pigment ink 3, provided that the anionic self-emulsification ether polyurethane, XW-75-W932, manufactured by MITSUI CHEMICALS POLYURETHANES, INC., having the acid value of 80 was changed to the anionic self-emulsification carbonate polyurethane, manufactured by MITSUI CHEMICALS POLYURETHANES, INC., having the acid value 70.

<Preparation of Cyan Pigment Ink 49>

Cyan pigment ink 49 was obtained in the same manner as in preparation of cyan pigment ink 4, provided that the styrene acrylic resin, J-690, manufactured by BASF, having the acid value of 240, was changed to the styrene acrylic resin, manufactured by SEIKO PMC CORPORATION, having the acid value of 248.

<Preparation of Cyan Pigment Ink 50>

Cyan pigment ink 50 was obtained in the same manner as in preparation of cyan pigment ink 4, provided that the styrene acrylic resin, J-690, manufactured by BASF, having the acid value of 240, was changed to the styrene acrylic resin, manufactured by SEIKO PMC CORPORATION, having the acid value of 98.

<Preparation of Cyan Pigment Ink 51>

Cyan pigment ink 51 was obtained in the same manner as in preparation of cyan pigment ink 4, provided that the styrene acrylic resin, J-690, manufactured by BASF, acid value: 240, was changed to the styrene acrylic resin, manufactured by SEIKO PMC CORPORATION, acid value: 250.

<Preparation of Cyan Pigment Ink 52>

Cyan pigment ink 52 was obtained in the same manner as in preparation of cyan pigment ink 4, provided that the styrene acrylic resin, J-690, manufactured by BASF, having the acid value of 240, was changed to the styrene acrylic resin, manufactured by SEIKO PMC CORPORATION, having the acid value of 96.

<Preparation of Cyan Pigment Ink 53>

Cyan pigment ink 53 was obtained in the same manner as in preparation of cyan pigment ink 4, provided that the styrene acrylic resin, J-690, manufactured by BASF, having the acid value of 240, was changed to AP4710, acrylic silicone resin emulsion, manufactured by SHOWA HIGHPOLYMER CO., LTD.

Example 1

Ink cartridge 1 was obtained by combining inks 1, 2, 3, and 4, to be filled in the ink pack for inkjet printer IPSiO GX 5000, manufactured by RICOH Company Limited.

Example 2

Ink cartridge 2 was obtained by combining inks 40, 42, 47, and 49, to be filled in the ink pack for inkjet printer IPSiO GX 5000, manufactured by RICOH Company Limited.

Example 3

Ink cartridge 3 was obtained by combining inks 40, 43, 47, and 50, to be filled in the ink pack for inkjet printer IPSiO GX 5000, manufactured by RICOH Company Limited.

Example 4

Ink cartridge 4 is obtained by combining inks 40, 44, 47, and 51, to be filled in the ink pack for inkjet printer IPSiO GX 5000, manufactured by RICOH Company Limited.

Example 5

Ink cartridge 4 is obtained by combining inks 40, 45, 47, and 52, to be filled in the ink pack for inkjet printer IPSiO GX 5000, manufactured by RICOH Company Limited.

Example 6

Ink cartridge 6 was obtained by combining inks 5, 2, 3, and 4, to be filled in the ink pack for inkjet printer IPSiO GX 5000, manufactured by RICOH Company Limited.

Example 7

Ink cartridge 7 was obtained by combining inks 6, 2, 3, and 4, to be filled in the ink pack for inkjet printer IPSiO GX 5000, manufactured by RICOH Company Limited.

Example 8

Ink cartridge 8 was obtained by combining inks 7, 2, 3, and 4, to be filled in the ink pack for inkjet printer IPSiO GX 5000, manufactured by RICOH Company Limited.

Example 9

Ink cartridge 9 was obtained by combining inks 8, 2, 3, and 4, to be filled in the ink pack for inkjet printer IPSiO GX 5000, manufactured by RICOH Company Limited.

Example 10

Ink cartridge 10 was obtained by combining inks 9, 2, 3, and 4, to be filled in the ink pack for inkjet printer IPSiO GX 5000, manufactured by RICOH Company Limited.

Example 11

Ink cartridge 11 was obtained by combining inks 10, 2, 3, and 4, to be filled in the ink pack for inkjet printer IPSiO GX 5000, manufactured by RICOH Company Limited.

Example 12

Ink cartridge 12 was obtained by combining inks 11, 2, 3, and 4, to be filled in the ink pack for inkjet printer IPSiO GX 5000, manufactured by RICOH Company Limited.

Example 13

Ink cartridge 13 was obtained by combining inks 12, 2, 3, and 4, to be filled in the ink pack for inkjet printer IPSiO GX 5000, manufactured by RICOH Company Limited.

Example 14

Ink cartridge 14 was obtained by combining inks 1, 13, 18, and 23, to be filled in the ink pack for inkjet printer IPSiO GX 5000, manufactured by RICOH Company Limited.

Example 15

Ink cartridge 15 was obtained by combining inks 1, 14, 19, and 24, to be filled in the ink pack for inkjet printer IPSiO GX 5000, manufactured by RICOH Company Limited.

Example 16

Ink cartridge 16 was obtained by combining inks 1, 15, 20, and 25, to be filled in the ink pack for inkjet printer IPSiO GX 5000, manufactured by RICOH Company Limited.

Example 17

Ink cartridge 17 was obtained by combining inks 1, 16, 21, and 26, to be filled in the ink pack for inkjet printer IPSiO GX 5000, manufactured by RICOH Company Limited.

Example 18

Ink cartridge 18 was obtained by combining inks 1, 17, 22, and 27, to be filled in the ink pack for inkjet printer IPSiO GX 5000, manufactured by RICOH Company Limited.

Example 19

Ink cartridge 19 was obtained by combining inks 1, 28, 33, and 37, to be filled in the ink pack for inkjet printer IPSiO GX 5000, manufactured by RICOH Company Limited.

Example 20

Ink cartridge 20 was obtained by combining inks 1, 29, 33, and 37, to be filled in the ink pack for inkjet printer IPSiO GX 5000, manufactured by RICOH Company Limited.

Example 21

Ink cartridge 21 was obtained by combining inks 1, 30, 34, and 38, to be filled in the ink pack for inkjet printer IPSiO GX 5000, manufactured by RICOH Company Limited.

Example 22

Ink cartridge 22 was obtained by combining inks 1, 31, 35, and 39, to be filled in the ink pack for inkjet printer IPSiO GX 5000, manufactured by RICOH Company Limited.

Comparative Example 1

Ink cartridge 23 is obtained by combining inks 41, 2, 48, and 4, to be filled in the ink pack for inkjet printer IPSiO GX 5000, manufactured by RICOH Company Limited.

Comparative Example 2

Ink cartridge 24 is obtained by combining inks 1, 46, 3, and 53, to be filled in the ink pack for inkjet printer IPSiO GX 5000, manufactured by RICOH Company Limited.

Using ink cartridges 1 to 3 and 6 to 22, an image was printed on PPC paper, manufactured by Fuji Xerox Co., Ltd. The printed image was measured by a Xrite concentration meter. In addition, bleeding, jetting stability, and ink storage stability, was evaluated as described bellow.

Using ink cartridges 4, 5, 23, and 24, an image can be printed on PPC paper, manufactured by Fuji Xerox Co., Ltd. The printed image is measured by a Xrite concentration meter. In addition, bleeding, jetting stability, and ink storage stability, can be evaluated as described bellow. Tables 1 to 3 show the results.

TABLE 1

| | | Ink No | Acid value \|A-B\| | Dispersant content % | Dimer to tetramer content % | n | Bleeding | Jetting stability | Preservation stability |
|---|---|---|---|---|---|---|---|---|---|
| Ex 1 | Bk | 1 | 160 | 5 | 50 | | A | A | A |
| | Y | 2 | | 7.5 | | 40 | | | |
| | M | 3 | | 7.5 | | 40 | | | |
| | C | 4 | | 7.5 | | 40 | | | |
| Ex 2 | Bk | 40 | 200 | 5 | 50 | | A | A | A |
| | Y | 42 | | 7.5 | | 40 | | | |
| | M | 47 | | 7.5 | | 40 | | | |
| | C | 49 | | 7.5 | | 40 | | | |
| Ex 3 | Bk | 40 | 50 | 5 | 50 | | A | A | A |
| | Y | 43 | | 7.5 | | 40 | | | |
| | M | 47 | | 7.5 | | 40 | | | |
| | C | 50 | | 7.5 | | 40 | | | |
| Ex 4 | Bk | 40 | 202 | 5 | 50 | | A | A | B |
| | Y | 44 | | 7.5 | | 40 | | | |
| | M | 47 | | 7.5 | | 40 | | | |
| | C | 51 | | 7.5 | | 40 | | | |
| Ex 5 | Bk | 40 | 48 | 5 | 50 | | B | A | A |
| | Y | 45 | | 7.5 | | 40 | | | |
| | M | 47 | | 7.5 | | 40 | | | |
| | C | 52 | | 7.5 | | 40 | | | |
| Ex 6 | Bk | 5 | 160 | 5 | 20 | | A | A | A |
| | Y | 2 | | 7.5 | | 40 | | | |
| | M | 3 | | 7.5 | | 40 | | | |
| | C | 4 | | 7.5 | | 40 | | | |
| Ex 7 | Bk | 6 | 160 | 5 | 80 | | A | A | A |
| | Y | 2 | | 7.5 | | 40 | | | |
| | M | 3 | | 7.5 | | 40 | | | |
| | C | 4 | | 7.5 | | 40 | | | |
| Ex 8 | Bk | 7 | 160 | 5 | 19 | | A | A | B |
| | Y | 2 | | 7.5 | | 40 | | | |
| | M | 3 | | 7.5 | | 40 | | | |
| | C | 4 | | 7.5 | | 40 | | | |
| Ex 9 | Bk | 8 | 160 | 5 | 81 | | A | B | A |
| | Y | 2 | | 7.5 | | 40 | | | |
| | M | 3 | | 7.5 | | 40 | | | |
| | C | 4 | | 7.5 | | 40 | | | |
| Ex 10 | Bk | 9 | 160 | 0.25 | 50 | | A | A | A |
| | Y | 2 | | 7.5 | | 40 | | | |
| | M | 3 | | 7.5 | | 40 | | | |
| | C | 4 | | 7.5 | | 40 | | | |

TABLE 2

| | | Ink No | Acid value \|A-B\| | Dispersant content % | Dimer to tetramer content % | n | Bleeding | Jetting stability | Preservation stability |
|---|---|---|---|---|---|---|---|---|---|
| Ex 11 | Bk | 10 | 160 | 12.5 | 50 | | A | A | A |
| | Y | 2 | | 7.5 | | 40 | | | |
| | M | 3 | | 7.5 | | 40 | | | |
| | C | 4 | | 7.5 | | 40 | | | |
| Ex 12 | Bk | 11 | 160 | 0.2 | 50 | | A | B | A |
| | Y | 2 | | 7.5 | | 40 | | | |
| | M | 3 | | 7.5 | | 40 | | | |
| | C | 4 | | 7.5 | | 40 | | | |
| Ex 13 | Bk | 12 | 160 | 15 | 50 | | A | A | B |
| | Y | 2 | | 7.5 | | 40 | | | |
| | M | 3 | | 7.5 | | 40 | | | |
| | C | 4 | | 7.5 | | 40 | | | |
| Ex 14 | Bk | 1 | 160 | 5 | 50 | | A | A | A |
| | Y | 13 | | 7.5 | | 200 | | | |
| | M | 18 | | 7.5 | | 200 | | | |
| | C | 23 | | 7.5 | | 200 | | | |
| Ex 15 | Bk | 1 | 160 | 5 | 50 | | A | A | B |
| | Y | 14 | | 7.5 | | 20 | | | |
| | M | 19 | | 7.5 | | 20 | | | |
| | C | 24 | | 7.5 | | 20 | | | |
| Ex 16 | Bk | 1 | 160 | 5 | 50 | | A | A | B |
| | Y | 15 | | 7.5 | | 300 | | | |
| | M | 20 | | 7.5 | | 300 | | | |
| | C | 25 | | 7.5 | | 300 | | | |
| Ex 17 | Bk | 1 | 160 | 5 | 50 | | A | A | B |
| | Y | 16 | | 7.5 | | 10 | | | |
| | M | 21 | | 7.5 | | 10 | | | |
| | C | 26 | | 7.5 | | 10 | | | |
| Ex 18 | Bk | 1 | 160 | 5 | 50 | | A | A | B |
| | Y | 17 | | 7.5 | | 40 | | | |
| | M | 22 | | 7.5 | | 40 | | | |
| | C | 27 | | 7.5 | | 40 | | | |
| Ex 19 | Bk | 1 | 160 | 5 | 50 | | A | A | A |
| | Y | 28 | | 6 | | 40 | | | |
| | M | 32 | | 6 | | 40 | | | |
| | C | 36 | | 6 | | 40 | | | |
| Ex 20 | Bk | 1 | 160 | 5 | 50 | | A | A | A |
| | Y | 29 | | 40 | | 40 | | | |
| | M | 33 | | 40 | | 40 | | | |
| | C | 37 | | 40 | | 40 | | | |

TABLE 3

| | | Ink No | Acid value \|A-B\| | Dispersant content % | Dimer to tetramer content % | N | Bleeding | Jetting stability | Preservation stability |
|---|---|---|---|---|---|---|---|---|---|
| Ex 21 | Bk | 1 | 160 | 5 | 50 | | A | A | B |
| | Y | 30 | | 5.5 | | 40 | | | |
| | M | 34 | | 5.5 | | 40 | | | |
| | C | 38 | | 5.5 | | 40 | | | |
| Ex 22 | Bk | 1 | 160 | 5 | 50 | | A | A | B |
| | Y | 31 | | 45 | | 40 | | | |
| | M | 35 | | 45 | | 40 | | | |
| | C | 39 | | 45 | | 40 | | | |
| Co Ex 1 | Bk | 41 | 170 | 5 | 50 | | B | B | C |
| | Y | 2 | | 7.5 | | 40 | | | |
| | M | 48 | | 7.5 | | 40 | | | |
| | C | 4 | | 7.5 | | 40 | | | |
| Co Ex 2 | Bk | 1 | — | 5 | 50 | | C | B | B |
| | Y | 46 | | 7.5 | | 40 | | | |
| | M | 3 | | 7.5 | | 40 | | | |
| | C | 53 | | 7.5 | | 40 | | | |

<Bleeding Between Colors>

A pattern with different colors lay side-by-side was printed (ink cartridges 1-3 and 6-22). The bleeding between the colors was evaluated by checking the printed pattern visually with a limit sample having a predetermine degree of bleeding at the border.

A: Little bleeding occurred;
B: Bleeding occurred but allowable;
C: Bleeding occurred severely, not allowable.

The same bleeding between colors is conducted for ink cartridges 4-5 and 23-24.

<Jetting Stability>

Ink cartridges 1-3 and 6-22.

A printer was put in a thermo-hygrostat chamber and the intra-chamber environment was held at a temperature of 32° C. and a relative humidity of 30% RH. A printing pattern chart as described below was printed for imaging consecutively on 20 sheets of paper and then a sheet feed state where no ink was ejected is held for 20 minutes. The above cycle was repeated for 50 times to print a total of 1,000 sheets. Thereafter, the nozzle plate was observed under a microscope to determine the presence or absence of ink adhesion to the nozzle surface. The rating criteria are shown below.

—Printing Pattern Chart—

The printing pattern chart was such that the area of each color was 5% relative to the entire area of the printed sheet of paper and a pattern was printed with each ink at a 100% duty cycle. The printing conditions include a recording density of 300 dpi and one-pass printing.

—Rating Criteria for Evaluation—

A: No ink adhesion was observed on the nozzle surface.
B: Ink adhesion was observed on a part of the nozzle surface.
C: Ink adhesion was observed on the entirety of the nozzle surface.

The same evaluations is conducted for ink cartridges 4-5 and 23-24.

<Preservation Stability>

Ink catriges 1-3 and 6-22.

Each inkjet ink was placed and sealed in a polyethylene container and then stored at 70° C. for three weeks. Thereafter, a particle diameter, surface tension, and viscosity of the inkjet recording ink were measured. The change of the rate in physical properties from the initial physical properties was calculated.

The Preservation Stability was evaluated based on the following evaluation criteria.

—Evaluation Criteria—

A: The change rate in physical properties was less than 10% in all of the evaluation items of the particle diameter, surface tension, and viscosity.

B: The change rate in physical properties was less than 30% in all of the evaluation items of the particle diameter, surface tension, and viscosity.

C: At least one evaluation item such as the particle diameter, surface tension, or viscosity had a change rate in physical properties of 50% or more.

The evaluations is conducted for ink cartridges 4-5 and 23-24.

Numerous modification and variations on the embodiments are possible in light of the above teachings. It is therefore to be understood that within the scope of the appended claims, an object of the invention may be practiced otherwise than as specifically described herein.

What is claimed is:

1. An inkjet ink set comprising:
a first pigment ink, and
a second pigment ink,
wherein the first pigment ink comprises at least one anionic self-emulsification ether polyurethane, and
the second pigment ink comprises at least one styrene acrylic resin emulsion, wherein acid value A (mgKOH/g) of the anionic self-emulsification ether polyurethane and acid value B (mgKOH/g) of the styrene acrylic resin emulsion satisfy the following relation:

$$50 \leq |A-B| \leq 200.$$

2. The ink set according to claim 1,
wherein the first pigment ink comprises at least one ink selected from the group consisting of a black pigment ink and a magenta pigment ink, and
the second pigment ink comprises at least one ink selected from the group consisting of a yellow pigment ink and a cyan pigment ink.

3. The ink set according to claim 2,
wherein the first pigment ink comprises at least one black pigment ink which contains from 0.01 parts to 0.5 parts of a sodium naphthalenesulfonate formalin condensate per 1 part of the first pigment ink, and
an amount of a dimer, a trimer, and a tetramer of the sodium naphthalenesulfonate formalin condensate is from 20% to 80% by mass per the total mass of monomers and all multimers of the sodium naphthalenesulfonate formalin condensate.

4. The ink set according to claim 2,
wherein the ink set comprises the cyan pigment ink, the magenta pigment ink, and the yellow pigment ink each of which contains a surfactant having the following formula (1):

wherein R is a C1-20 alkyl group, a C1-20 allyl group, or a C1-20 aralkyl group; l is an integer of 0 to 7; and n is an integer of 20 to 200 in the formura (1), wherein $(R)_l$ may be the same or different.

5. The ink set according to claim 2,
wherein the ink set comprises the cyan pigment ink, the magenta pigment ink, and the yellow pigment ink each of which contains a surfactant having the following formula (2):

wherein R is a C1-20 alkyl group, a C1-20 allyl group, or a C1-20 aralkyl group; l is an integer of 0 to 2; and n is an integer of 30 to 50 in the formula (2), wherein $(R)_l$ may be the same or different.

6. An ink cartridge comprising:
a first container containing the first pigment ink and a second container containing the second pigment ink as defined in claim 1.

7. An image forming device comprising:
an ink cartridge as defined in claim 6, and
a first recording head for ejecting the first pigment ink and a second recording head for ejecting the second pigment ink to form an image, wherein the first pigment ink and the second pigment ink are supplied from the ink cartridge.

8. A method for forming an image on a substrate comprising applying the first pigment ink and the second pigment ink as defined in claim 1 to a substrate.

9. A printed substrate comprising a composition produced by drying the first pigment ink and second pigment ink as defined in claim 1.

10. The printed substrate according to claim 9 which is paper.

* * * * *